United States Patent

Haneda et al.

[11] Patent Number: 5,840,461
[45] Date of Patent: Nov. 24, 1998

[54] PROCESS FOR PRODUCING CYLINDRICAL SUBSTRATE FOR IMAGE FORMATION

[75] Inventors: Satoshi Haneda; Hisayoshi Nagase; Hiroyuki Tokimatsu; Masahiro Onodera; Shuta Hamada, all of Hachioji; Toshihide Miura, Koganei; Fumitaka Mochizuki, Hachioji, all of Japan

[73] Assignee: Konica Corporation, Japan

[21] Appl. No.: 827,259

[22] Filed: Mar. 28, 1997

[30] Foreign Application Priority Data

| Apr. 3, 1996 | [JP] | Japan | 8-081373 |
| Jun. 7, 1996 | [JP] | Japan | 8-145901 |
| Jun. 12, 1996 | [JP] | Japan | 8-151032 |
| Oct. 1, 1996 | [JP] | Japan | 8-260730 |

[51] Int. Cl.⁶ ..................................... G03G 5/00
[52] U.S. Cl. ........................ 430/133; 264/310; 264/311; 430/134; 430/127; 430/69
[58] Field of Search ............... 264/310, 311; 430/133, 134, 127, 69

[56] References Cited

U.S. PATENT DOCUMENTS

| 3,294,889 | 12/1966 | Downie et al. | 264/311 |
| 5,465,138 | 11/1995 | Jaskowizk et al. | 264/311 |

FOREIGN PATENT DOCUMENTS

| 0488151 | 6/1992 | European Pat. Off. |
| 0671667 | 9/1995 | European Pat. Off. |
| 0723207 | 7/1996 | European Pat. Off. |
| 404110112 | 4/1992 | Japan | 264/311 |

OTHER PUBLICATIONS

Patent Abstracts of Japan Publication # 08290484, Nov. 5, 1996.
Patent Abstracts of Japan Publication # 08292591, Nov. 5, 1996.
Patent Abstracts of Japan Publication # 61203460, Sep. 9, 1986.
Patent Abstracts of Japan Publication # 63254013, Oct. 20, 1988.
Patent Abstracts of Japan Publication # 03287601, Dec. 18, 1991.
Patent Abstracts of Japan, Publication # 62042812, Feb. 24, 1987.
Patent Abstracts of Japan, Publication # 62060615, Mar. 17, 1987.

*Primary Examiner*—James Derrington
*Attorney, Agent, or Firm*—Jordan B. Bierman; Bierman, Muserlian and Lucas

[57] ABSTRACT

A method of producing a substrate for a photoreceptor having an exposing device therein for use in an electrophotographic apparatus, including the steps of: injecting polymerizable liquid material into a die whose inner surface is cylindrical; polymerizing the polymerizable liquid material while rotating and heating the die so that a substrate is formed inside the die; and removing the substrate from the die after the polymerizing, wherein the polymerizable liquid material is a transparent resin material and a thickness of the substrate is controlled according to an injecting amount of the polymerizable liquid material.

22 Claims, 18 Drawing Sheets

PROCESS FOR PRODUCING CYLINDRICAL SUBSTRATE FOR IMAGE FORMATION

BACKGROUND OF THE INVENTION

The present invention relates to a cylindrical substrate used for a photoreceptor drum in an image forming apparatus, a method of manufacturing aforesaid cylindrical substrate and an image forming apparatus employing a photoreceptor drum comprising aforesaid cylindrical substrate thereon with a light-sensitive layer.

As a method of forming a multi-color image, one being a color image forming apparatus (A) wherein image forming means, chargers and developing devices whose number are identical to that of colors necessary for color image forming and a color image is formed by superposing respective monochromatic toner images formed on the image forming body on a recording sheet by a transfer device, a color image forming apparatus (B) wherein the image forming body is rotated plural times so that charging, image exposure and developing for each color are repeated for forming a full color image and a color image forming apparatus (C) which successively conducts charging, image exposure and developing within one rotation of the image forming body for forming a color image are known.

However, among each of the above-mentioned image forming apparatus, a color image forming apparatus (A) has the shortcoming to expand the volume of the apparatus since it is necessary to convey plural image forming bodies and recording sheets. On the other hand, in the case of a color image forming apparatus (B) is limited to not larger than the surface area of the photoreceptor though there is a merit that the volume of the apparatus is downsized.

Though the above-mentioned color-image-forming apparatus (C) has merits that there is no limit to the image size and an image can be formed within a short time, it is necessary to arrange plural sets of each means of charging, image exposure and developing. Therefore, downsizing of such an image forming body and the related apparatus has a limit. To the contrary, an apparatus in which a transparent member is used for a substrate of an image forming body, an image exposure means is housed therein and downsizing of an image forming body is accomplished by image-exposing from its interior has been invented.

Generally, in an image forming apparatus forming an image by means of an electrophotographic system, charging, image exposure and development are conducted on a rotating drum-shaped or a belt-shaped electrostatic image forming body so that a toner image is formed on aforesaid electrostatic image forming body so that aforesaid toner image is transferred onto a recording medium and fixed. In order to accomplish the functions, the electrostatic image forming body must be maintained to have distance between and pressure contact with chargers, an exposure device, developing devices, transferring device, a discharger and a cleaning device which are arranged in the periphery of the image forming body, and must rotate at a prescribed timing and at a prescribed speed.

In order to repeat to use the electrostatic image forming body, it must return to the initial position for the next image forming cycle after the functions of one cycle of an image forming process is finished. In practical apparatuses, most electrostatic image forming bodies employ a photoreceptor drum in which a light-sensitive layer is provided on the circumference of a cylindrical substrate. As a material for the cylindrical substrate, metal materials such as aluminum are commonly used.

However, in an image forming apparatus having a structure in which an image is exposed from inside of the electrostatic image forming body, a cylindrical substrate of the electrostatic image forming body must be transparent against light beam exposed from inside and thereby metal cannot be used for the material of a substrate.

On the other hand, plastic is considered to be a preferable material due to light weight, low cost and light transmissivity can be obtained. However, according to a conventional molding method such as an injection molding method, it was not easy to manufacture an electrostatic image forming body with high accuracy in terms of cylinder and effectively in terms of industry. The major cause was that a method to simply and accurately manufacture it with high accuracy roundness and cylindricity of 10–50 $\mu$m. Therefore, conventionally, after manufacturing the cylindrical substrate, accuracy must be maintained by mechanical processing such as cutting or polishing the surface, resulting in reduction of producibility and increase in cost. In addition, the material has a shortcoming to be weak to heat and solvent during processing.

It is considered to manufacture a cylindrical substrate for electrophotography by injecting a polymerizable liquid material in a cylindrical die and polymerizing while rotating and heating the die (centrifugal polymerization).

Exposure unit located inside of the above-mentioned cylindrical substrate is composed of, for example, an LED element (a light source) and a Selfoc lens (an image-forming element). From the viewpoint of the optical length of the optical system, it is necessary to control the thickness of the substrate itself. In addition, thickness influences on peeling property from the die and the strength of substrate. However, if thickness is regulated by cutting or polishing, the above-mentioned problems occur during processing steps. In addition, it is necessary to take considerable time.

The present invention improves the problems. An objective thereof is to easily manufacture a substrate for a photoreceptor having high dimensional accuracy and desired thickness.

However, since the substrate of the image forming body is located anywhere along the optical path of image exposure in the above-mentioned case, there occurs a problem that color doubling occurs and image quality is deteriorated since fluctuation occurs in terms of registration between images superimposed or out-of focus phenomenon occur due to rise of ambient temperature, heat swelling due to heating by the light source for image exposure, distortion due to pressure contact by developing means and a cleaning means and uneven rotation.

The present invention is to solve and improve the above-mentioned issues. Another objective of the present invention is to form a high quality color image at high speed by realizing a transparent image forming body which is provided with sufficient strength against external force and which can adequately cope with temperature change.

In addition, in the above-mentioned centrifugal polymerization method, it is necessary to polymerize a cylindrical substrate with uniform thickness in a circumferential direction and in a shaft direction in which there is neither distortion nor stress.

The present invention improves the above-mentioned issues. It is still another objective to provide a manufacturing method of a substrate for electrophotography in which a cylindrical substrate is polymerized with uniform thickness in which there is neither distortion nor stress.

When polymerizing, a cylindrical substrate has an identical mechanical accuracy with a die which is brought into close contact with the inner surface of the die. However, it was found that dimension change occurs when removing the substrate from the die. Due to this, dimensional accuracy of the substrate manufactured becomes insufficient so that yield also becomes insufficient.

When reaction speed is increased when polymerizing, the temperature is raised. At this status, the temperature was lowered to room temperature. As a result, internal stress remains in the cylindrical substrate which deforms it, deteriorating dimensional accuracy.

In order to improve this, the present inventors thought of a method to prevent deformation by conducting annealing while the substrate is cooled from high temperature to room temperature.

However, in the above-mentioned proposal, when a cylindrical substrate after polymerization reaction is chilled in a die and the die and the cylindrical substrate are separated, peeling of the outer circumference of a cylindrical substrate from aforesaid die is not conducted uniformly, and unevenness and micro wrinkle due to distortion due to the difference of internal stress between a chilled and peeled portion and a un-peeled portion occurs, resulting in unfavorable surface accuracy so that a cylindrical substrate having high accuracy roundness is not formed. Accordingly, an image produced by the image forming apparatus causes uneven density or uneven color occur.

Still yet another objective of the present invention is to provide a manufacturing method of a cylindrical substrate for electrostatic image forming apparatus in which there no occurrence of distortion when chilling and peeling of the cylindrical substrate from a die, the cylindrical substrate can be produced effectively in terms of industry, dimensional accuracy in terms of straightness and decentering is favorable, entire strength is high and it has excellent surface accuracy and high accuracy roundness and cylindricity.

In addition, since the focal depth of the Selfoc lens, as a life size image-forming element used for an image exposure means, is so shallow as to be about ±100 μm, if there is thickness fluctuation on the transparent resin substrate, an image exposure beam due to the image exposure means cannot correctly be focused, uneven image formation (focus unevenness) occurs and thereby favorable color image cannot be formed due to image blur. In addition, in non-contact development employing a drum-shaped image forming body using a transparent resin substrate, uneven development in a DSD (development gap) occurs due to diameter fluctuation of the transparent resin substrate, resulting in image density fluctuation. Still further, since the substrate of the image forming body is located in an optical path of image exposure, fluctuation occurs on the registration between images superposed or out-of-focus occurs causing color doubling and thereby image quality is deteriorated, due to the influence of rise of ambient temperature, heat swelling caused by heating of the light source of the image exposure beam or distortion or rotation fluctuation due to pressure contact of the developing means or the cleaning means.

Still another objective of the present invention is to realize a drum-shaped image forming body having a transparent resin substrate which does not tend to produce image-formation unevenness (out-of focus) of an image exposure beam, also does not tend to produce uneven development in non-contact development, which is provided with sufficient strength against external force and which can cope with temperature change.

SUMMARY OF THE INVENTION

One of the above-mentioned objectives is attained by a manufacturing method having a constitution exhibited below: A manufacturing method of the substrate of a photoreceptor having an exposing means therein used in an electro-photographic apparatus in which a polymerizable liquid material is injected into a die, an inner surface of which is cylindrical, the above-mentioned polymerizable liquid material is polymerized by applying rotation and heat to the above-mentioned die so that a substrate is formed inside the above-mentioned die, and the above-mentioned die is taken up from the die after polymerization, wherein the polymerizable liquid material is a transparent resin material and the thickness of the substrate is controlled according to the amount of the polymerizable liquid material injected.

DETAILED DESCRIPTION OF THE PREFERRED EMBODIMENT

An image forming process and associated mechanisms for a color image forming apparatus of an embodiment of the present invention will be explained referring to FIGS. 1–9.

Figure 1:
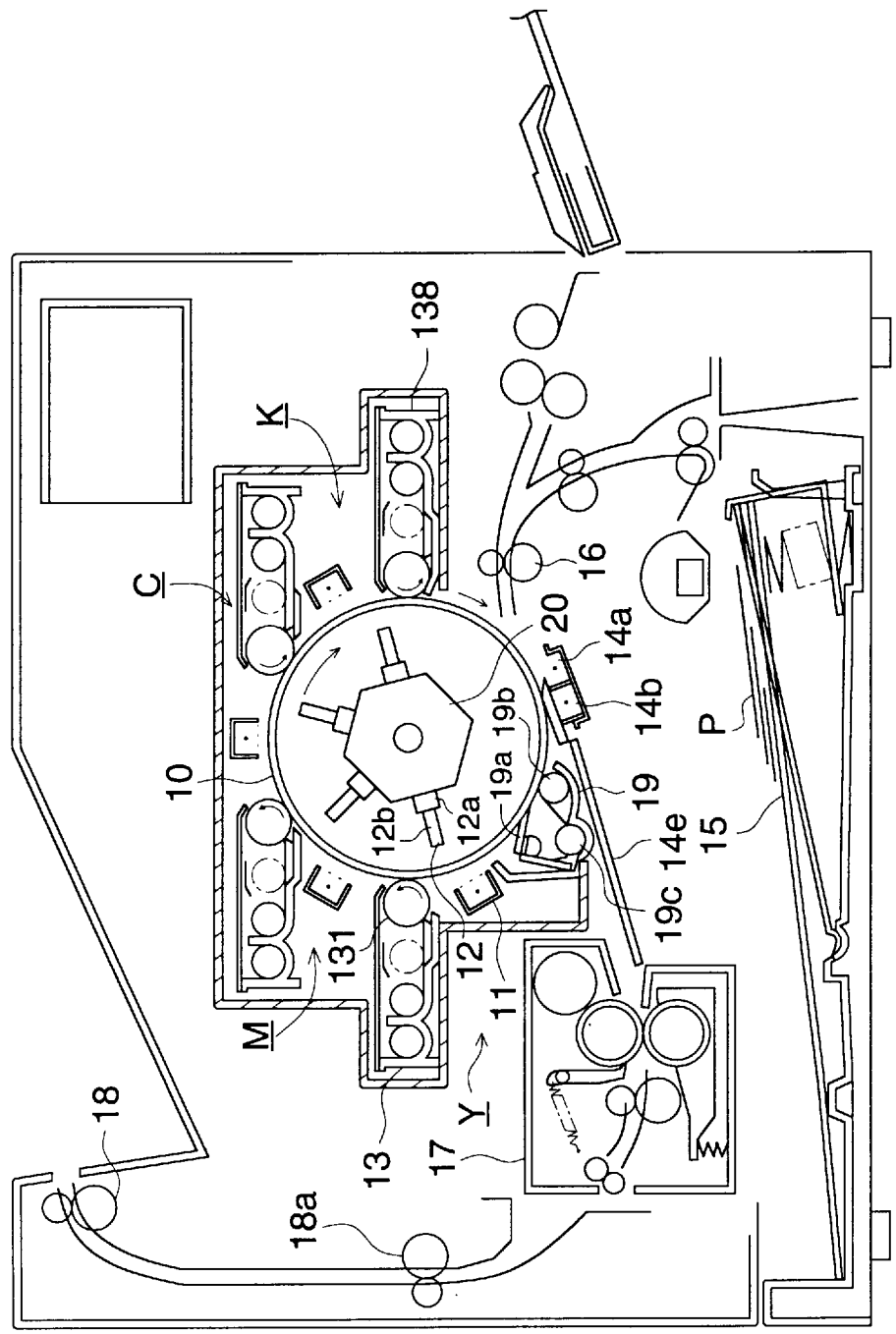
FIG. 1 is a cross sectional schematic view of a color image forming apparatus showing an embodiment of the present invention.
Figure 2:
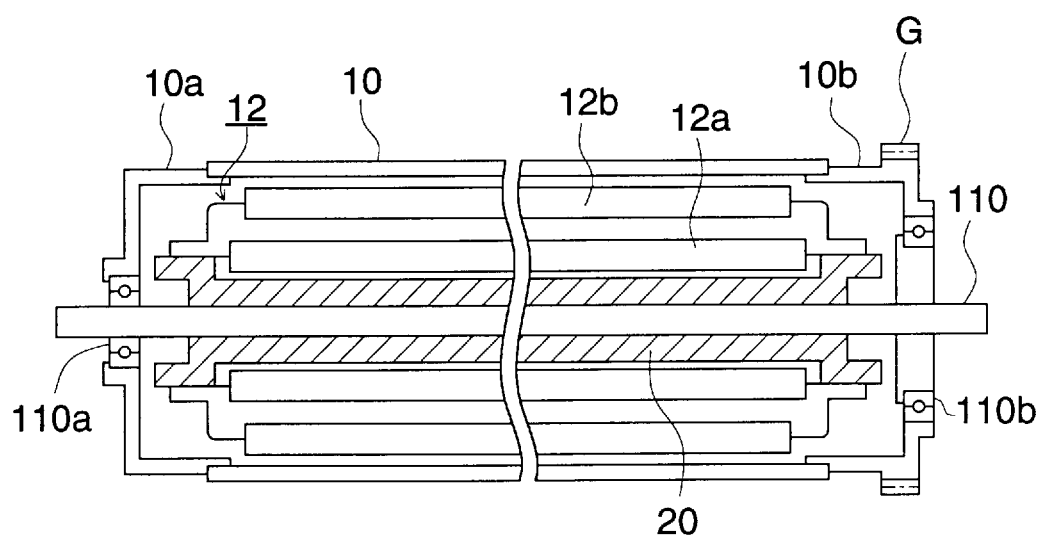
FIG. 2 shows a cross sectional side view for a principal part of FIG. 1.
Figure 3:
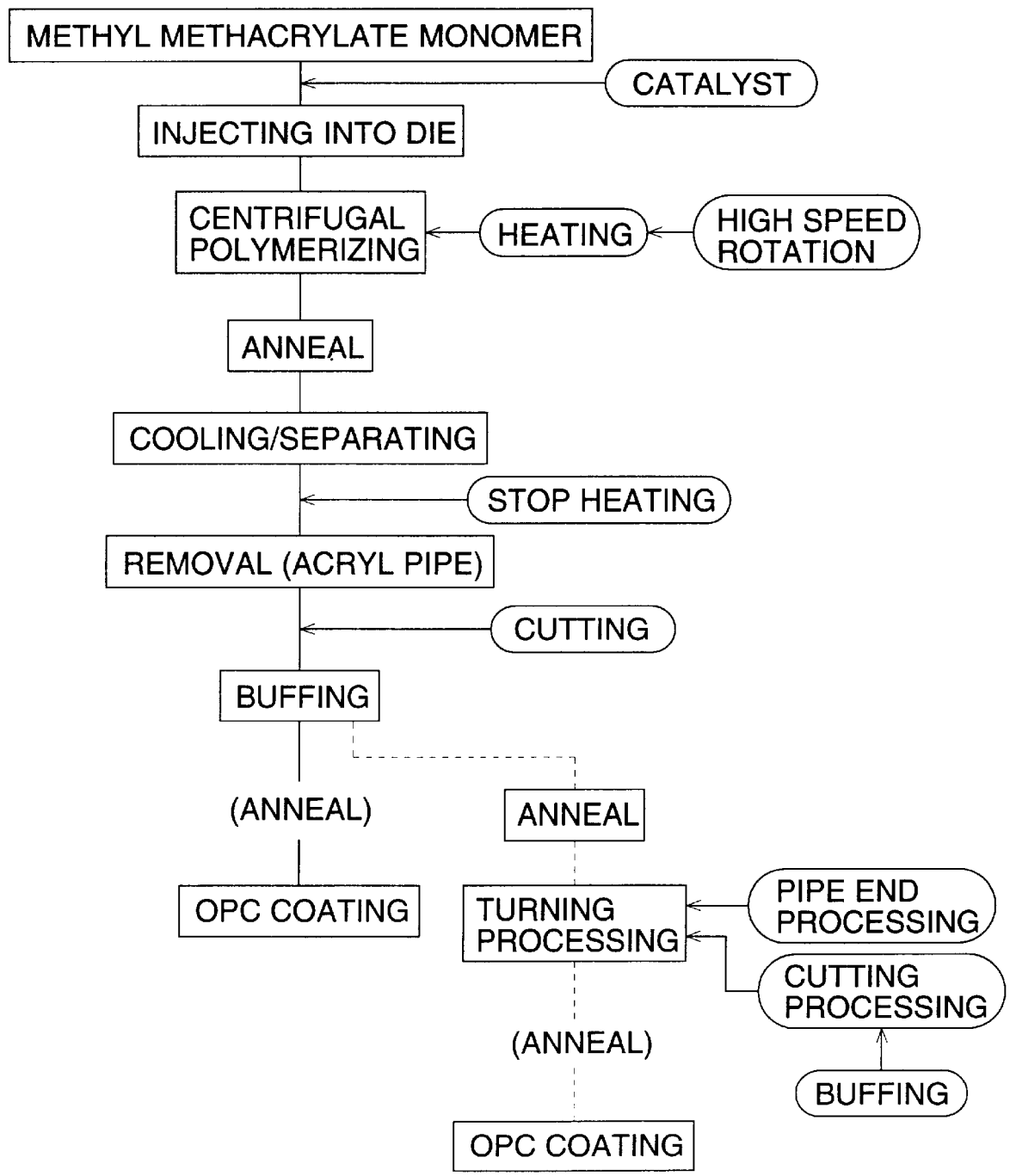
FIG. 3 is a drawing showing a process of manufacturing method of a transparent resin substrate for an image forming body.
Figure 4:
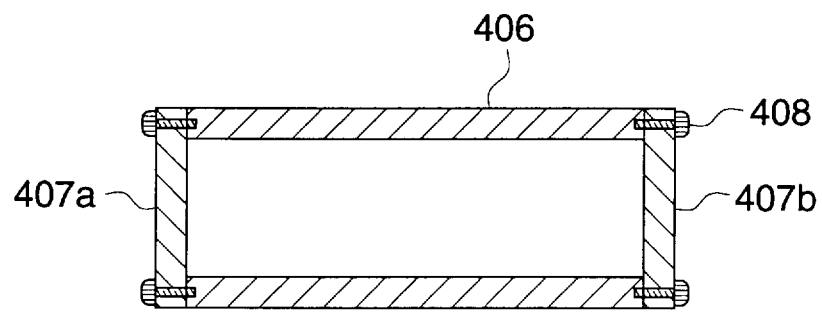
FIG. 4 is a drawing showing one example of a molding die for a transparent resin substrate.
Figure 5:
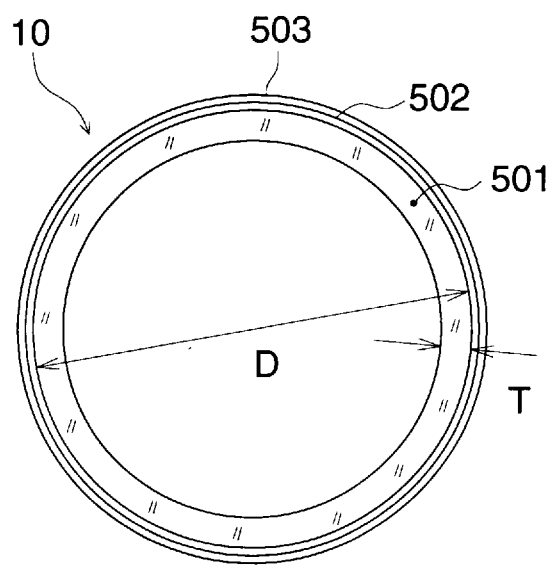
FIG. 5 shows a cross sectional view of a drum-shaped image forming body.
Figure 6:
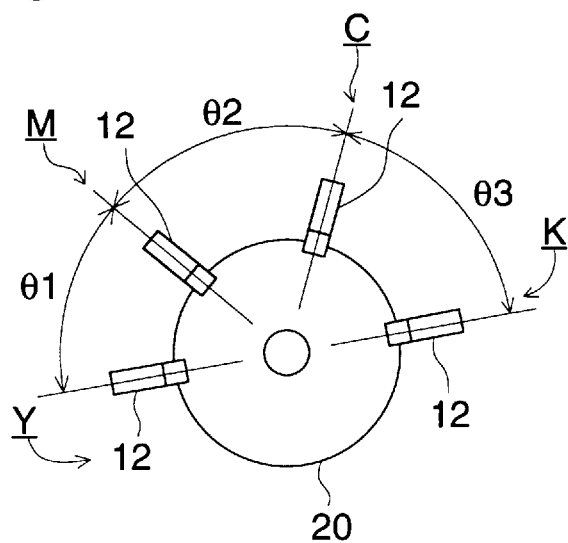
FIG. 6 shows a location drawing of an image exposure means.
Figure 7:
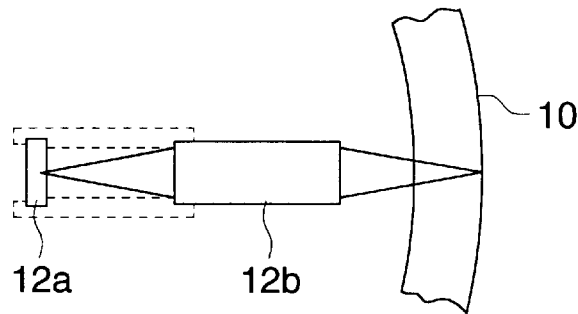
FIGS. 7(A), 7(B) and 7(C) are enlarged drawings showing image-formation of an image exposure beam onto the image forming body.
Figure 7:
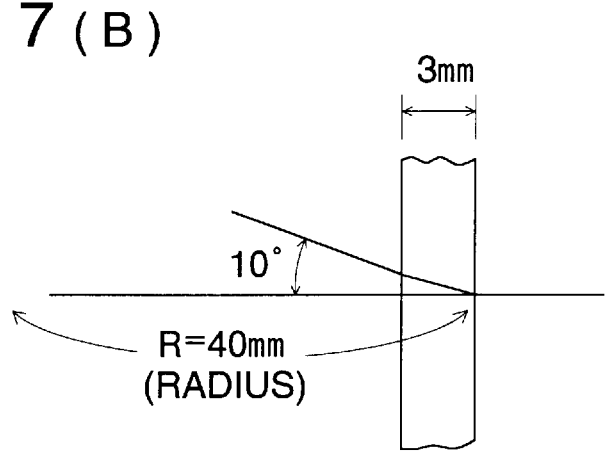
Figure 7:
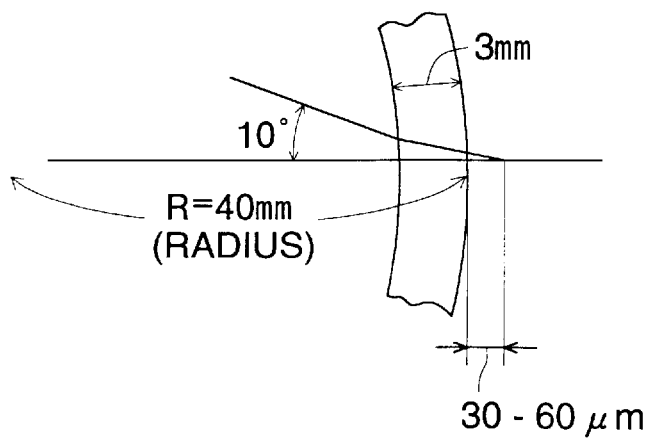
Figure 8:
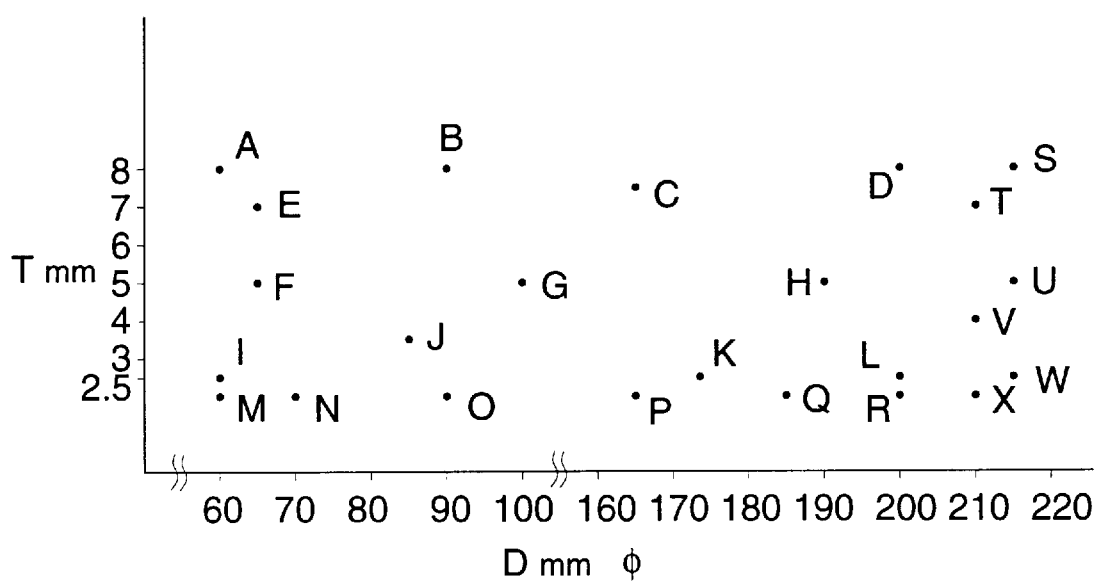
FIG. 8 is a graph showing the distribution of the thickness and the inner diameter of the substrate for the photoreceptor drum.
Figure 9:
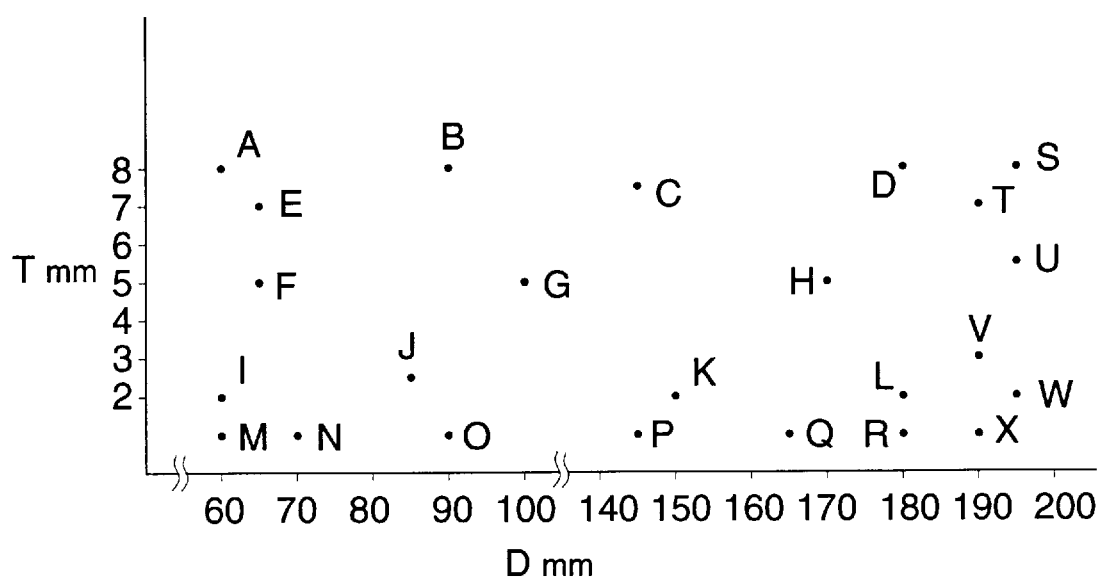
FIG. 9 is a drawing showing the distribution of the thickness and the outer diameter of the transparent resin substrate for the drum-shaped image forming body.

FIG. 1 is a cross sectional view of a color image forming apparatus showing an embodiment of the present invention. FIG. 2 is a cross sectional side view of the main section of FIG. 1. FIG. 3 is a block diagram showing a manufacturing process of a transparent resin substrate of an image forming body of the present invention. FIG. 4 is one Example of a die of a transparent resin substrate for molding. FIG. 5 is a cross sectional view of a drum-shaped image forming body. FIG. 6 shows a layout of an image exposure means. FIGS. 7(A), 7(B) and 7(C) are enlarged view of an image-formation status of an image exposure beam from the image exposure means to the image forming body. FIG. 7(A) is a schematic view of an image-formation system. FIG. 7(B) shows an image-formation status in a primary scanning direction. FIG. 7(C) is a drawing showing an image formation status in the secondary scanning direction. FIG. 8 is a graph showing the distribution of the thickness and the inner diameter of the substrate for the photoreceptor drum. FIG. 9 is a drawing showing distribution of the thickness and the outer-diameter of the transparent resin substrate for the drum-shaped image forming body.

The color image forming apparatus of the embodiment of the present invention employs a photoreceptor drum in which a conductive layer and a photoreceptor layer are provided on the circumferential surface of the transparent resin substrate as a drum-shaped image forming body. Inside the photoreceptor drum, an image exposure means is provided. Around the exterior of the photoreceptor drum, an image forming process means such as a charger, a developing means, a transferor, a discharger and a cleaning device are provided.

Photoreceptor drum 10, which is a drum-shaped image forming body, is provided therein with a cylindrical resin substrate 101 formed with a transparent member made of a transparent acrylic resin. The substrate is provided with transparent conductive layer 102 and organic photoreceptor layer (OPC) 103 on the outer circumference thereof. Aforesaid photoreceptor drum is rotated clockwise as shown by an arrow in FIG. 1 while being grounded.

In the present embodiment, the photoreceptor drum may incorporate an exposure light amount capable of providing an appropriate contrast in the photoconductive layer. Therefore, the light transmissive ratio of the transparent resin substrate for the photoreceptor drum in the present embodiment need not necessarily be 100%. The substrate may also have a property in which exposure beams may be absorbed to some extent when the exposure beams transmits through the transparent substrate. As material of the transparent substrate, acrylic resin-polymerized materials are so excellent in terms of transparency, strength, accuracy and surface properties as to be preferably used. In addition, various translucent resins such as acrylic, fluorine, polyester, polycarbonate and polyethylene terephthalate which are used in ordinary members are also usable. Aforesaid resins may be colored provided that they have translucency against exposed beam. The refractive index of aforesaid resins is almost 1.5. As a layer forming method of the translucent conductive layer, by the use of a vacuum deposition method, an active reaction deposition method, any spattering method, any CVD method, a thin layer maintaining translucency composed of indium, tin, oxidized products, alumina, tin oxide, lead oxide, indium oxide, copper iodide, Au, Ag, Ni and Al are produced. In addition, by the use of dip coating methods and spray coating methods, conductive resins composed of the above-mentioned fine particles of metals and binder resins can be prepared. In addition, as a photoconductive layer, each organic photoreceptor layer (OPC) are usable.

Scorotron chargers 11, which are used as a charging means, are used for an image forming process for each of yellow(Y), magenta (M), cyan (C) and black (K) colors. Aforesaid scorotron charger provides charging effect by means of a control grid and discharging electrodes in which potential is maintained to a prescribed level compared with the above-mentioned photoreceptor layer on photoreceptor drum 10, thereby providing uniform potential onto photoreceptor drum 10.

Exposure units 12, as the image exposure means for each color, are respectively composed integrally of a bar-shaped exposure element 12a, in which plural LEDs (light emission diode) as a light emission element arranged in the primary scanning direction and parallel to the shaft of photoreceptor drum 10 are arranged in an array form and Selfoc lens 12b as a life size image-formation element as units mounted on holders.

Exposure units 12 for each color are integrally mounted on retention member 20 which jointly retains exposure units 12 provided inside of photoreceptor drum 10, in which image data of each color stored in the memory is successively read and inputted into exposure units 12 of each color as an electrical signal.

In addition, as an exposure element, a bar-shaped one may be used wherein plural light emission elements such as FLs (fluorescent light emission), an EL (electroluminescence), PLs (plasma discharge) and LEDs (light emission diode) are arranged in an array mode. The light emission wavelength of the light emission element used in the present embodiment is preferably in a range between 600 to 900 nm which has a high transmissive rate to Y, M and C toner. However, since image exposure is carried out from the rear surface, a wavelength, shorter than the above-mentioned value, which does not have sufficient transparency to color toner may be used.

Next, order of color wherein images are formed and the type of developing devices provided in accordance with aforesaid color order in the present embodiment will be explained. In the present invention, photoreceptor drum 10 rotates in an arrowed direction as shown in FIG. 1. Y and M developing devices 13 are located to the left of photoreceptor drum 10. C and K developing devices are located to the right of photoreceptor drum 10. Y and M scorotron chargers 11 are located respectively below development casing 138 of Y and M developing devices 13. C and K scorotron chargers 11 are located respectively above development casing 138 of C and K developing devices 13.

Each of the four developing devices 13, which is a developing means for each color, respectively houses a one-component or two-component yellow (Y), magenta (M), cyan (C) or black (K) developer. The developing devices maintain a prescribed gap from the circumference of photoreceptor 10, and are provided with development sleeves 131 which rotate in the same direction as the rotation direction of photoreceptor drum 10 at developing position.

The developing devices for each color reversely develop electrostatic latent images on photoreceptor drum 10 formed due to charging by means of the scorotron chargers 11 and image exposure by means of exposure units 12 under non-contact state by means of a non-contact development method due to applying the development bias voltage.

With regard to the original images, images read by an image sensor in an image reading device separately provided from the present apparatus or images edited by a computer are temporally stored in the memory as images for each of Y, M, C and K colors.

When starting image recording, a driving motor for the photoreceptor (not illustrated) is driven so that photoreceptor drum 10 is rotated clockwise as shown by an arrow in FIG. 1. Simultaneously, provision of potential onto photoreceptor drum 10 starts due to charging effect of Y scorotron charger 11 which is provided to the left of photoreceptor drum 10.

After photoreceptor 10 is provided with potential, in Y exposure unit 12, exposure by means of an electrical signal which corresponds to the first color signal, i.e., Y image data starts. Due to the rotation and scanning of the drum, electrostatic latent images which corresponds to Y images of the original image are formed on the photosensitive layer on the surface of aforesaid drum.

The latent image is reversely developed by Y developing device 13 while the developer on the development sleeve is in a non-contact state. In accordance with rotation of photoreceptor drum 10, a yellow (Y) toner image is formed in accordance with photoreceptor drum 10.

Next, on the yellow (Y) toner image, photoreceptor drum 10 is provided with potential due to charging effect by magenta (M) scorotron charger 11 which is located to the left of photoreceptor drum 10 and below development casing 138 of magenta (M) developing device 13. Then, in M exposure unit 12, exposure by means of an electrical signal which corresponds to the second color signal, i.e., M image data starts. Magenta (M) toner image is successively superposed on the yellow (Y) toner image due to non-contact reversal development by means of M developing device 13.

Under the same process, the cyan (c) toner image corresponding to the third color signal due to cyan scorotron charger 11 which is located to the right of photoreceptor drum 10 and above development casing 138 of development device 13, C exposure unit 12 and C developing device 13 and black (K) toner image corresponding to the fourth color signal due to black scorotron charger 11 which is located to the right of photoreceptor drum 10 and above development casing 138 of development device 13, K exposure unit 12 and K developing device 13 are successively superposed so that, as a result, a color toner image is formed on the circumference of photoreceptor drum 10 within one rotation of photoreceptor drum 10.

Organic photosensitive layer on photoreceptor drum 10 is exposed to light from inside the drum through the transparent substrate by means of Y, M, C and K exposure unit 12. Accordingly, image exposure corresponding to the second, third and fourth color signal receives no influence by the toner image superposed in advance so that electrostatic latent image equivalent to an image corresponding to the first color image can be formed.

Photoreceptor drum 10 and developing device 13 are kept in non-contact at a prescribed gap, for example, 100–1000 $\mu$m due to a spacing roller (not illustrated). When conducting development by developing devices 13 for each color, development bias of D.C. voltage or D.C. voltage in conjunction with A.C. voltage are applied to development sleeve 131. Jumping development by means of a one-component or two-component developer housed in a developing device is conducted. Onto photoreceptor drum 10 wherein a transparent conductive layer is grounded, D.C. bias having the same polarity as the toner is applied. Thus, non-contact reversal development wherein toner is adhered onto the exposed portion is conducted. Development gap accuracy in this occasion is necessary to be about 20 $\mu$m or less for preventing uneven density of the image.

Recording sheet P, which is a transfer medium, is fed from paper feeding cassette 15 which is a recording sheet housing means, and conveyed to timing rollers 16. Color toner image formed on the circumference of photoreceptor drum 10 is transferred by the transfer device 14a onto recording sheet P which is fed synchronously with the toner image on photoreceptor drum 10 by the drive of the timing rollers 16.

Recording sheet P on which toner image has been transferred is subjected to neutralization at discharger 14b, and then is separated from the circumference of the drum. Following this, the recording sheet is conveyed to fixing device 17 by means of conveyance belt 14e, which is a conveyance means. At fixing device 17, the recording sheet is heated and pressed so that the toner is fused and fixed onto recording sheet P. Following this, the recording sheet is discharged from fixing device 17. The recording sheet is conveyed by means of paired paper-ejecting conveyance rollers 18a to be fed out on a tray located above the apparatus with the toner image surface facing downward.

With regard to photoreceptor drum 10 from which the recording sheet has been separated, the surface of photoreceptor drum 10 is scraped by cleaning blade 19a at cleaning device 19 so that residual toner is removed and the drum surface is clean. Following this, the formation of the toner image of the original image will be continued, or the formation temporarily stops, and then, the formation of the toner image of the next original image will be started. Waste toner scraped by cleaning blade 19a is discharged to a waste toner container (not illustrated) by toner conveyance screw 19b.

As shown in FIG. 2, in photoreceptor 10, flange members 10a and 10b which engage and support the photoreceptor drum 10 on both end are supported rotatably by means of bearings 110a and 110b mounted on flange members 10a and 10b on the both ends of drum shaft 110 integrated in the apparatus main body. Due to that gear G integrally provided with flange member 10b is engaged with a driving gear on the apparatus main body to be driven, the photoreceptor drum is rotated at a constant speed in a prescribed direction.

Drum shaft 110 penetrates retention member 20 which mounts each of the above-mentioned exposure unit 12 for each color for retention inside photoreceptor drum 10 to fix retention member 20 integrally.

As described above, developing devices 13 are respectively elastically biased to the circumference of photoreceptor drum 10 from the horizontal direction, in which the gap between development sleeve 131 and drum circumference, i.e., a development gap, is set at a prescribed gap due to rotatable spacing rollers (not illustrated), provided on the both ends of the shaft of the development sleeve 131, which cause to be press the non-image region on the drum circumference portion. With regard to cleaning device 19, cleaning blade 19a is always brought into pressure contact with the circumference of photoreceptor drum 10, by which residual toner from a toner image after transferring is successively removed to be cleaned.

Accordingly, photoreceptor drum 10 receives external force due to pressure contact by each developing device 13 and cleaning device 19, and also receives influence by temperature rise due to heating by the heat source of each exposure unit 12.

Photoreceptor drum 10 has thickness T, as shown in the cross sectional view of FIG. 5. Preferably, it comprises a transparent resin substrate 501, made of a transparent acrylic resin molded by means of centrifugal polymerization, conductive layer 502 formed on the external surface of transparent resin substrate and organic photoreceptor layer (OPC) 503 as a photoconductive photoreceptor layer formed on the circumference of conductive layer 502.

Hereinafter, preferable image forming body will now be exemplified.

In accordance with a processing method as shown in FIG. 3, a monomer, which is a raw material for plastic, is synthesized in a cylindrical die 406 shown in FIG. 4. After a catalyst is added thereto for polymerization, aforesaid monomer is injected into a cylindrical die. Left and right side plates 407a and 407b are secured with screw 408. By rotating this apparatus at a high speed and appropriately heating, uniform polymerization is accelerated. After polymerization is finished, the resulting body is chilled. The resulting transparent resin substrate is taken from the die and cut, and if necessary, the resulting substrate is subjected to a finishing process. Thus, transparent resin substrate 501 for photoreceptor drum in an image forming apparatus can be manufactured.

As an element for transparent-plastic-made transparent resin substrate 501 molded by means of centrifugal polymerization, as described above, those employing methylester methacrylic acid monomer are the most preferable in terms of transparency, strength, accuracy and surface property. In addition, polymethacrylic ethyl, polymethacrylic butyl, polyacrylic acid ethyl, polyacrylic acid butyl, polystyrene, polyimide, polyester or polyvinylchloride or their copolymers are usable. According to the centrifugal polymerization method, the roundness is determined by a die used for molding. Therefore, a substrate with high accuracy can be obtained. In addition, the fluctuation of the thickness changes depending upon uneven rotation, viscosity and heating conditions when polymerizing.

Detailed manufacturing method of photoreceptor drum will be shown as below.

Figure 10:
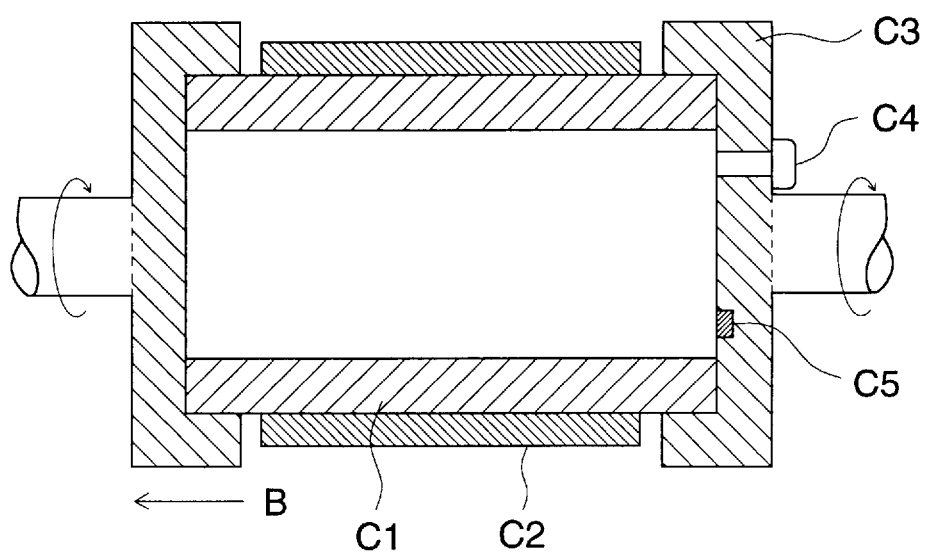
FIG. 10 shows a cross sectional view of one example of a substrate manufacturing apparatus.

FIG. 10 shows an example of a manufacturing apparatus of a substrate employing a centrifugal polymerization method. In the manufacturing apparatus in FIG. 10, C1 is a cylindrical die in which the inner surface is polished for forming a favorable and high-accuracy cylindrical surface. C2 is a heated member. From outside of the die C1, heating is applied. C3, a die retention member, sandwiches die C1 from left and right. When sandwiching, liquid inside die C1 may not leak. C4 is an injecting port, through which polymerizable liquid material is injected. C5 is a thermometer, measuring temperature inside die C1. This apparatus is regulated in such a manner that C1 axis becomes horizontal, and after injecting polymerizable liquid material, it rotates at a high speed. After molding, by shifting one of die retention member C3 to an B-arrowed direction, the cylindrical substrate can be taken out.

When manufacturing, at first, polymerizable liquid material, for example, a methacrylic acid methylester monomer was synthesized, to which a catalyst was added in order to polymerize promptly so as to regulate viscosity to 10 to 400 cp, and then the resulting polymer was injected into a cylindrical die C1. The inner diameter of this cylindrical die is necessary to be 65 mm to 216 mm, and the length is necessary to be 200 mm or more. The liquid amount of the polymerizable liquid material to be injected is regulated in such a manner that the layer thickness of substrate, after being molded, would be 1 mm–8 mm. After injecting, this was rotated together with the die, and concurrently with this by appropriately heating, uniform polymerization is accelerated. After polymerization, the polymer was subjected to annealing processing to reduce temperature extremely slowly to a room temperature. Next, the resulting substrate was taken out from the die, and then cut or finish as necessary to form a cylindrical substrate for image forming apparatus.

As described above, by controlling the amount of the polymerizable liquid material injected into the die, the outer diameter and the thickness (and the inner diameter of the substrate) of the photoreceptor drum can be determined.

Accordingly, additional processing for regulating the thickness after being chilled is not necessary. Deformation following processing can also be prevented so that processing time can be shortened.

Compared with an extrusion method, which is a conventional molding method, the above-mentioned centrifugal polymerization method does not produce scratches from the die on the surface of cylindrical substrate. Specifically, the inner surface is formed naturally obtained from centrifugal force and is as extremely smooth as glass surface. Moreover, compared with a cylindrical substrate obtained by the extrusion method, this method is excellent in terms of stable mechanical strength having no orientation and thermo-deformation temperature. In addition, since it has less internal stress, there is no uneven light refraction when light is transmitted. Therefore, even if it is applied to an image forming apparatus shown in FIG. 1, image exposure may not distorted and image performance is not caused.

It is possible to achieve more preferable physical properties of the cylindrical substrate for use in an electrostatic image forming body by mixing a cross-linking agent, an electric conductivity providing agent, or a coloring agent with the polymerizable liquid material. For example, it is possible to enhance heat-resistance, resistance to solvents and strength, by adding the cross-linking agent, to prevent electrostatic soil due to ambient dust and to replace electric conductive layer by the electrical conductivity providing agent. These are effective for the electrostatic image forming body to which an outer force or heat is applied during use, or for a substrate onto which a solution is coated.

The acrylic cylindrical substrate obtained through the manufacturing process has no internal distortion, has mechanical strength in which the Young's modulus was $0.30 \times 10^{10}$ N/m$^2$ or more and the shear modulus (G) was $0.12 \times 10^{10}$ N/m$^2$ or more and also has light transmissive ratio at 90% or more against light wavelength of 500–900 nm and also has shock durability of 15 times stronger than glass.

EXAMPLE 1

1. Preparation of cylindrical substrate

To methacrylic acid methyl monomer, azobisisobutylonitrile was added as a catalyst for accelerating polymerization. At 40° C., the resulting mixture was heated for one hour for preliminary polymerization so that a sirup-type polymerizable liquid material whose viscosity was 100 cp was obtained. This polymerizable liquid material was injected into a cylindrical die whose inner diameter was 100 mm and the length was 80 cm, and the die was rotated. Due to centrifugal force, the liquid material was brought into contact with the inner wall of the die. In place of heated member C2, as a heating means, water evaporation was used for heating the die at 2° C./minute. The entire die was subjected to heating for 8 hours at 100° C. for polymerization. The resulting substrate was subjected to annealing processing in which the substrate was chilled to room temperature at 2° C./min. Following this, the substrate was taken up from the die. The end of the resulting substrate was subjected to cutting so that 2 pcs of substrates whose outer diameter was 100 mm, layer thickness was 5 mm and the length was 360 mm were obtained. In addition, as necessary, the outer circumference was subjected to cutting by means of a cutting tool for obtaining 2 pcs of cylindrical substrates were obtained.

On the outer circumference of the substrate, ITO fine particles dispersed in a binder were coated for obtaining a cylindrical transparent substrate having transmissive ratio against light beam whose wavelength was 500–900 nm was 85% and also having a 2 μm thickness conductive layer.

When the mechanical strength of cut portion of the adjoining to the substrate was measured, Young's modulus was $0.33 \times 10^{10}$ N/m² and the shear modulus was $0.14 \times 10^{10}$ N/m².

2. Coating of OPC

The following compounds were mixed and dissolved for obtaining a subbing layer coating solution:

| | |
|---|---|
| Alcohol soluble polyamide CM-8000 (produced by Toray) | 4 parts by weight |
| Methanol | 80 parts by weight |
| 1-buthanol | 20 parts by weight |

The cylindrical transparent substrate of the present invention was dipped in the above-mentioned coating solution for obtaining a 0.5 μm thickness subbing layer. Next, the following compounds were mixed:

| | |
|---|---|
| Y-type titanyl phthalocyanine | 4 parts by weight |
| Silicone resin solution KR-5240 (produced by ShinEtsu Chemical) | 45 parts by weight |
| 2-butanone | 100 parts by weight |

The mixture was dispersed for 10 hours with a sandmill for obtaining a charge generation layer coating solution. The above-mentioned subbing layer was dipped in the coating solution for obtaining a 0.25 μm thickness charge generation layer.

The following compounds were mixed and dissolved for obtaining a charge transportation generation layer:

| | |
|---|---|
| Charge transportation material T-1 | 8 parts by weight |
| Bisphenol type Z polycarbonate Z-300 (produced by Mitsubishi Gas Chemical Co., Ltd.) | 12 parts by weight |
| 1,2-dichloroethane | 100 parts by weight |

T-1

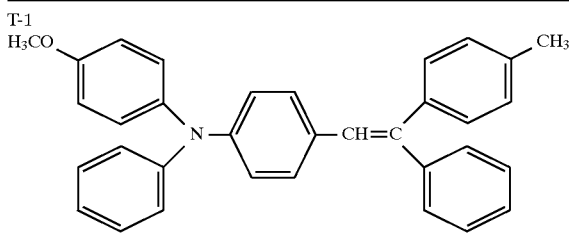

The above-mentioned charge generation layer was dipped in the coating solution for coating, and then subjected to heat processing at 1 hour for 90° C. for forming a 25 μm thickness charge transportation layer. Thus, a photoreceptor of an Example of the present invention was obtained.

The general lower limit of the outer diameter of the above-mentioned drum substrate 101 capable of housing each of exposure optical systems 12 integrated with the above-mentioned drum shaft 110 and supporting member 20 shall be 50 mm, and more preferably not less than 60 mm. The upper limit of the diameter which can be measured by an experiment capable of guaranteeing mechanical strength as photoreceptor drum 10 together with thickness (T) selected in advance may be set.

For an experiment, photoreceptor drum 10 having each kind and each dimension made of plural drum substrate 101 in which the combination of thickness (T) and inner diameter (D) are different as shown in Table 1 and FIG. 8. Each photoreceptor drum is incorporated in an image forming apparatus so that images are formed. By evaluating image quality of an image obtained therefrom, the form of drum substrate 101 which receive influence by neither distortion nor deformation may be obtained.

Table 1 shows the results thereof. "a" (excellent) represents extremely excellent, "b" (good) represents relatively favorable, "b'" (acceptable) represents considerably inferior though it can be put into practical use and "c" (bad) represents impractical results. From above, it is preferable that the thickness of drum substrate is 2–8 mm and the outer diameter is 210 mm or less. Incidentally, it is specifically preferable that the thickness is 2.5 mm or more.

| | Thickness of the drum substrate (T) | Inner-diameter of the drum substrate (D) | Evaluation |
|---|---|---|---|
| Example A | 8 | 60 | a |
| B | 8 | 90 | a |
| C | 7.5 | 165 | a |
| D | 8 | 200 | a |
| E | 7 | 65 | a |
| F | 5 | 65 | a |
| G | 5 | 100 | a |
| H | 5 | 190 | a |
| I | 3 | 60 | a |
| J | 3.5 | 85 | a |
| K | 2.5 | 175 | a |
| L | 2.5 | 200 | a |
| M | 2 | 60 | b |
| N | 2 | 70 | b |
| O | 2 | 90 | b |
| P | 2 | 165 | b' |
| Q | 2 | 185 | b' |
| R | 2 | 200 | b' |
| S | 8 | 215 | c |
| T | 7 | 210 | c |
| U | 5.5 | 215 | c |
| V | 4 | 210 | c |
| W | 2.5 | 215 | c |
| X | 2 | 210 | c |

The above-mentioned test employed a transparent acrylic resin. If a transparent resin other than this is used as drum substrate 10, and is incorporated in an image forming apparatus for forming an image, favorable evaluation cannot be obtained in all instances. The present inventors determined that the cause is related to the strength of synthetic resin. They conducted testing about synthetic resins having different strength from each other. When measuring Young's modulus (E) and the shear modulus (G) which respectively show mechanical strength are measured, in the case of plastic substrate, they showed considerably low values. For example, in the case of polyethylene substrate, Young's modulus (E) was $0.077 \times 10^{10}$ N/m² and the shear modulus (G) was $0.026 \times 10^{10}$ N/m². With regard to enforced plastic in which glass fiber was added to plastic substrate, its strength can be changed stepwise depending upon the degree of addition of the glass fiber. However, as the addition amount of the glass fiber was increased, its transparency is gradually reduced, and finally lost the transparency. Accordingly, as a drum substrate of an image forming device, it is not preferable to use a reinforced plastic. Employing a reinforced plastic in which mechanical strength is different due to changing added amount of glass fiber, the present inventors prepared cylindrical substrates wherein favorable image was formed by the use of acrylic resins. The substrate was mounted on the image forming apparatus employed in the above-mentioned test, while rotating it at a prescribed circumference speed (80 mm/sec. in the present invention) in which developing means and a cleaning means are brought into contact with a cylindrical substrate, distortion status of the circumference of the cylindrical substrate was measured. According to the other experiment, when toner images are superposed on a photoreceptor drum for forming a color image, the amount of distortion of the photoreceptor drum in an radius direction which may not cause blurring on the color image is necessarily 8 µm or less. Therefore, we selected a cylindrical substrate in which the level of distortion is 8 µm or less in the measurement of the distortion status, and measured the strength of reinforced plastic of the selected cylindrical substrate. As a result, either of the following conditions were satisfied:

Young's modulus (modulus of elasticity E) was $0.30 \times 10^{10}$ N/m$^2$ or more Shear modulus (G) was $0.12 \times 10^{10}$ N/m$^2$ or more From the above, a transparent substrate used for a photoreceptor drum in a color image forming apparatus of the present invention employs plastic material in which the Young's modulus (E) was $0.30 \times 10^{10}$ N/m$^2$ (=$0.30 \times 10^{11}$ dyne/cm$^2$) or more and the shear modulus (G) was $0.12 \times 10^{10}$ N/m$^2$ (=$0.12 \times 10^{11}$ dyne/cm$^2$) or more, and also employs a molded cylindrical substrate in which the thickness was 2–8 mm and the outer diameter of 50–210 mm is used. Incidentally, as a plastic having the above-mentioned mechanical strength, acrylic resin and a polystyrene resin come under.

3. Image printing evaluation

In an electrophotographic type and inner exposure system color image forming apparatus having a structure shown in FIG. 1, a photoreceptor in which a light-sensitive layer was provided on a cylindrical substrate of the present example was loaded for image forming. As a result, no-fogging image having sufficient density was obtained. Specifically, an image excellent in uniformity was obtained in which no unevenness in terms of density or color tone on an image was observed. With regard to the above-mentioned excellent image in terms of uniformity, no image quality change was observed after continuous 10,000 printing.

Owing to the present invention, problems of distortion and deformation of the photoreceptor drum due to pressure contact by plural developing device or a cleaning device were solved. Due to this, superposing with high accuracy of plural toner images can be realized within one rotation of the photoreceptor drum. In addition, downsizing of the photoreceptor drum due to effective utilization of the space occupied by plural of exposure optical system becomes possible. As a result, an extremely practically useful color image forming apparatus capable of forming an image with high quality though being compact was provided.

In a conductive layer 502, a conductive resin wherein conductive tiny particles composed of Indium, tin, oxidized product (ITO), tine oxide, lead oxide, Indium oxide, alumina, copper iodide, Au, Ag, Ni and Al and resins are mixed can be used. As casting methods, a dip coating method and a spray coating method are preferably utilized. The layer thickness of a transparent conductive layer is preferably 1–5 µm.

In order to enhance transparency of the conductive layer, it is preferable to control the size of the diameter of fine particles constituting the conductive layer to 600 Å or less in a in the Rayleigh scattering resin (which is defined to be scattering due to fine particles having the size of diameter with 1/10 or less for the wavelength) wherein light scattering due to image exposure is scarcely found. As an element for constituting conductive fine particles, it is preferable to use fine particles whose primary particle size is 600 Å or less and also to control the central radius to 100 Å or less in terms of transparency and dispersion stability of liquid.

Organic photoreceptor layer 503 is composed of two layers in which its functions are separated into a charge generation layer (CGL) mainly composed of charge generation materials (CGM) and a charge transportation layer (CTL) mainly composed of charge transportation materials (CTM). Since the CGL is thin, the two-layer-constituted organic photoreceptor layer has favorable image exposure beam. Therefore, it is suitable for the present invention. Incidentally, organic photoreceptor drum 503 may comprise a single layer structure containing the charge generation materials (CGM) and the charge transportation materials (CTM) in a single layer. In aforesaid single-layered or the above-mentioned two-layered photoreceptor layer ordinarily contains a binder resin.

In the photoreceptor drum having an organic photoreceptor layer composed of the above-mentioned two layers, as the CGM contained in the CGL, azo-containing pigments having sensitivity to light source beam such as an LED and an LD, azulenium pigments, phthalocyanine pigments and perylene-containing pigments are used. Of these, as the CGM of the OPC photoreceptor sensitive to infrared beam (600 nm–850 nm), phthalocyanine copper pigments and titanyl phthalocyanine pigments (TiOPc) are preferably used.

In addition, as a binder resin capable of being used for the charge generation layer (CGL), for example, a polystyrene resin, a polyethylene resin, a polypropylene resin, a polyacrylic resin, a polymethacrylic resin, a vinyl polychloride resin, a vinyl polyacetic acid resin, a polyvinyl butylal resin, a polyepoxy resin, a polyurethane resin, a polyphenol resin, a polyester resin, a polyalkid resin, a polycarbonate resin, a polysilicone resin, a polymelamine resin and copolymers having two or more repetitive unit of the above-mentioned resin including a vinylchloride—vinyl acetic acid copolymer, a vinylchloride—vinyl acetic acid—maleic acid anhydride copolymer resin and polymer organic semiconductors such as poly-N-vinyl carbazole are cited. However, the present invention is not limited thereto. Of these, as a preferable binder when an imidazole perylene compound is used as the CGM, and when a polyvinyl butylal resin employs the TiOPc, those wherein a polysilicone resin and/or a polybutylal resin are mixed are cited.

As the solvent or a dispersion medium used for the formation of the CGL, ketone-containing or halogen-containing solvents are preferably used. Due to these, sensitivity and change of potential during repeated using become favorable. The above-mentioned solvents can be used independently or two or more thereof may be used as a mixed solvent.

Weight ratio between the CGM and the binder resin in the CGL shall be 100:1 to 100:1000. Layer thickness of aforesaid CGL shall be 0.01–10 µm. As a coating method for forming aforesaid CGL includes each coating method such as blade coating, wire bar coating, spray coating, a dip coating and a slide hopper coating are cited.

The charge transportation layer is composed of a charge transportation material (CTM) singly or together with a binder resin. As the CTM, a carbazole derivative, an oxazole derivative, a thiazole derivative, a thiadiazole derivative, a triazole derivative, an imidazole derivative, an imidazolone derivative, an imidazolidine derivative, a bisimidazolidine derivative, a styryl compound, a hydrazone compound, a pyrazoline derivative, an oxazolone derivative, a benzimidazole derivative, a quinazoline derivative, a benzofurane derivative, an acrylidine derivative, a phenasine derivative, an aminostylbene derivative, a triarylamine derivative, a phenylenediamine derivative, a stylbene derivative, a bendidine derivative, a poly-N-vinylcarbazole, a poly-1-vinylpylene and a poly-9-vinylanthracene are cited. The present invention is not limited thereto. In addition, the above-mentioned compound may be used singly or two or more thereof may be used in combination.

As a binder resin capable of usable for the charge transportation layer (CTL), a polycarbonate resin, a polyacrylate resin, a polyester resin, a polystyrene resin, a styrene-acrylnitrile copolymer resin, a polymethacrylic acid ester resin and a styrene-methacrylic acid ester copolymer are cited. However, the present invention is not limited thereto.

As a preferable binder resin, a silicone-alkyd resin, a phenol-formaldehyde resin, a poly-N-binylcarbazole and insulating resins such as polysilane are cited. The above-mentioned binder resin may be used singly or two or more thereof may be used in combination.

The compound ratio between the binder resin and the CTM is ordinarily 1:10–1:500 and preferably 1:20–1:150. The layer thickness of the CTL is ordinarily 1:100 $\mu$m and preferably 5:50 $\mu$m.

In order to reduce fatigue deterioration when used repeatedly or in order to improve durability, any conventional anti-oxidants, UV-absorbers, electron accepting substances, surface improvers, plasticizers and environment-dependency reducers may be added in an appropriate amount in any layer on the photoreceptor. In addition, in order to improve durability, a non-light sensitive layer such as a protective layer may be provided other than a light-sensitive layer as necessary.

As a coating method, an identical method as the CGL may be used.

Between organic photoreceptor layer 503 and conductive layer 502, as necessary, an intermediate layer may be provided. As the intermediate layer, a 0.1–2 $\mu$m resin layer such as for example, a vinyl chloride—vinyl acetic acid copolymer, a vinyl chloride—vinyl acetic acid and maleic acid copolymer, ethylcellulose, carboxymethylcellulose and a copolymer or a degenerated type alcohol soluble polyamide resin are used.

By the use of a plastic cylindrical transparent resin-made substrate manufactured by the above-mentioned manufacturing method, a photoreceptor drum having uniform layer thickness, having excellent cylindricity and roundness of the cylindrical substrate and having no out-of-focus of the image exposure beam can be provided.

For exposure unit 12, Selfoc lens which is a life size image-formation element whose length of optical path on an image-formation side is 2–8 mm from the viewpoint of the depth of focus and brightness. In order to include transparent resin-made substrate 501 in the optical path length, the transparent resin-made substrate 501 prefers to select the upper limit of the thickness (T) of transparent resin-made substrate 501 under 8 mm.

Incidentally, if the thickness is less than 1 mm, the strength becomes insufficient and polymerization fluctuation easily occurs. Therefore, thickness of 1 mm or more is preferable.

By the use of various transparent resin-made substrate 501 in which fluctuation of thickness is different each other, photoreceptor drums 10 were manufactured for experiment. As a result, in this image forming apparatus system, if the fluctuation of the thickness is larger than the average value by ±120 $\mu$m, blurred image due to the out of focus was obtained.

On the other hand, if the fluctuation of the thickness is less than ±120 $\mu$m, the entire image was sharp having no out-of-focus. In addition, if it is within ±60 $\mu$m, a sharp color image in which dot reproducibility is further improved and no blurred image was obtained.

Summarizing above, the allowable limit of the fluctuation of thickness of transparent resin substrate 501 is within ±120 $\mu$m from the average value and preferably within ±60 $\mu$m from the average value.

In addition, even if clear image exposure can be conducted, it turned out that further higher accuracy is required for the roundness of the photoreceptor drum as an image forming body from the result of another experiment.

If the roundness of transparent resin-made substrate 501 fluctuates by 30 $\mu$m or more compared with an experiment using a non-contact development in the above-mentioned image forming apparatus, density fluctuation of 0.1 or more as an image unevenness is observed on an image developed due to density variation. It was confirmed that, in order to prevent image unevenness, the roundness is preferable to be 30 $\mu$m or less.

In the above-mentioned manner, it was clarified that, in this image forming apparatus, even if there is fluctuation of thickness on transparent resin-made substrate 501, it is important that the roundness of the outer surface is less than that of the inner surface.

Incidentally, it is intrinsic that the fluctuation of the thickness and the roundness of the image forming body include those of the conductive layer and the photoreceptor layer. However, thickness unevenness of the transparent conductive layer and the photoreceptor layer is about 1–5 $\mu$m, whose attribution to the above-mentioned accuracy is small and ignorable. If the thickness unevenness of the transparent conductive layer and the photoreceptor layer is noticeable, photoreceptor properties, i.e., charging properties and light sensitivity, fluctuate, which are not preferable.

In addition, as shown in FIGS. 7(A), 7(B) and 7(C), in the image-formation system onto photoreceptor drum 10 in FIG. 7(A), the thickness of photoreceptor drum 10 (T) is 3 mm, the outer diameter (D) is 80 mm and the radius (R) is 40 mm for experimenting, though the focus position in the primary scanning direction of the image exposure beam on photoreceptor drum 10 is correctly formed, as shown in FIG. 7(C), the focus position in the secondary scanning direction is out of the focus by about 30–60 $\mu$m due to the curvature of the drum. In order to within depth of focus of Selfoc lens 12b±100 $\mu$m in the primary scanning direction and the secondary scanning direction, 60 mm or more which does not influence fluctuation of the thickness or roundness accuracy is preferable as an outer diameter (D).

Accordingly, the lower limit value of outer-diameter (D') of transparent resin-made substrate 501 is 600 mm, and on the other hand, the upper limit value can be set by measuring the maximum outer-diameter (D') capable of guaranteeing mechanical strength as photoreceptor drum 10 in conjunction with a pre-selected thickness (T).

In the experiment, as shown in a graph in Table 1 and a graph in FIG. 9, by means of plural substrate transparent resin substrate 501 respectively made of a methacrylic acid methylester monomer for polymerizing (G) and a transparent acrylic resin (P) whose thickness (T) and outer diameter (D') are different each other, photoreceptor drum 10 having different dimensions were formed by means of plural transparent resin substrate 501. The photoreceptor drum was actually incorporated in an image forming apparatus so that images are formed. By evaluating the resulting image, the upper limit of the transparent resin substrate 501 which does not receive influence from distortion or deformation due to external force may be obtained. In addition, the form of a substrate for photoreceptor wherein there is no influence by thickness fluctuation and the roundness is high.

Table 2 shows the results thereof. "a" (excellent) represents extremely excellent, "b" (good) represents relatively favorable, "b" (acceptable) represents considerably inferior though it can be put into practical use and "c" (bad) represents defective.

|  | Thickness of the drum substrate (T) | Outer-diameter of drum substrate (D') | Material | Evaluation |
|---|---|---|---|---|
| Example A | 8 | 60 | G | a |
|  |  |  | P | a |
| B | 8 | 90 | G | a |
|  |  |  | P | a |
| C | 7.5 | 145 | G | a |
|  |  |  | P | a |
| D | 8 | 180 | G | a |
|  |  |  | P | a |
| E | 7 | 65 | G | a |
|  |  |  | P | a |
| F | 5 | 65 | G | a |
|  |  |  | P | a |
| G | 5 | 100 | G | a |
|  |  |  | P | a |
| H | 5 | 170 | G | a |
|  |  |  | P | a |
| I | 2 | 60 | G | a |
|  |  |  | P | a |
| J | 2.5 | 85 | G | a |
|  |  |  | P | a |
| K | 2 | 150 | G | a |
|  |  |  | P | a |
| L | 2 | 180 | G | a |
|  |  |  | P | a |
| M | 1 | 60 | G | b |
|  |  |  | P | b |
| N | 1 | 70 | G | b |
|  |  |  | P | b |
| O | 1 | 90 | G | b |
|  |  |  | P | c |
| P | 1 | 145 | G | b |
|  |  |  | P | c |
| Q | 1 | 165 | G | c |
|  |  |  | P | c |
| R | 1 | 180 | G | c |
|  |  |  | P | c |
| S | 8 | 195 | G | b |
|  |  |  | P | b |
| T | 7 | 190 | G | b |
|  |  |  | P | b |
| U | 5.5 | 195 | G | b |
|  |  |  | P | b |
| V | 3 | 190 | G | b |
|  |  |  | P | b |
| W | 2 | 195 | G | b' |
|  |  |  | P | b' |
| X | 1 | 190 | G | c' |
|  |  |  | P | c' |

Thus, in photoreceptor drum 10 whose mechanical strength against external force was guaranteed, each exposure unit 12 housed therein is located on a common retention member 20 radially as shown in FIG. 6, equivalent distance is maintained even if the length of the circumference is expanded due to heat swelling. Therefore, the registration accuracy when superposing toner images are maintained. Accordingly, image quality can be guaranteed even depending upon the change of environmental temperature. In addition, by arranging each of central angles θ1, θ2 and θ3 to be the same or proportional, positioning control can be facilitated.

According to the present invention, the image exposure light beam by means of an image exposure means is accurately focused, image-formation unevenness is prevented and thereby a favorable color image having no image blurring may be formed.

Development unevenness in a non-contact development is prevented so that a favorable color image having no density fluctuation are formed.

Problems of distortion and deformation on the photoreceptor drum due to pressure contact by plural developing device and a cleaning device is dissolved, and a color image in which plural toner images are superimposed accurately within one rotation of the photoreceptor drum without fluctuation of the registration among the superimposed images, is formed.

Figure 11:
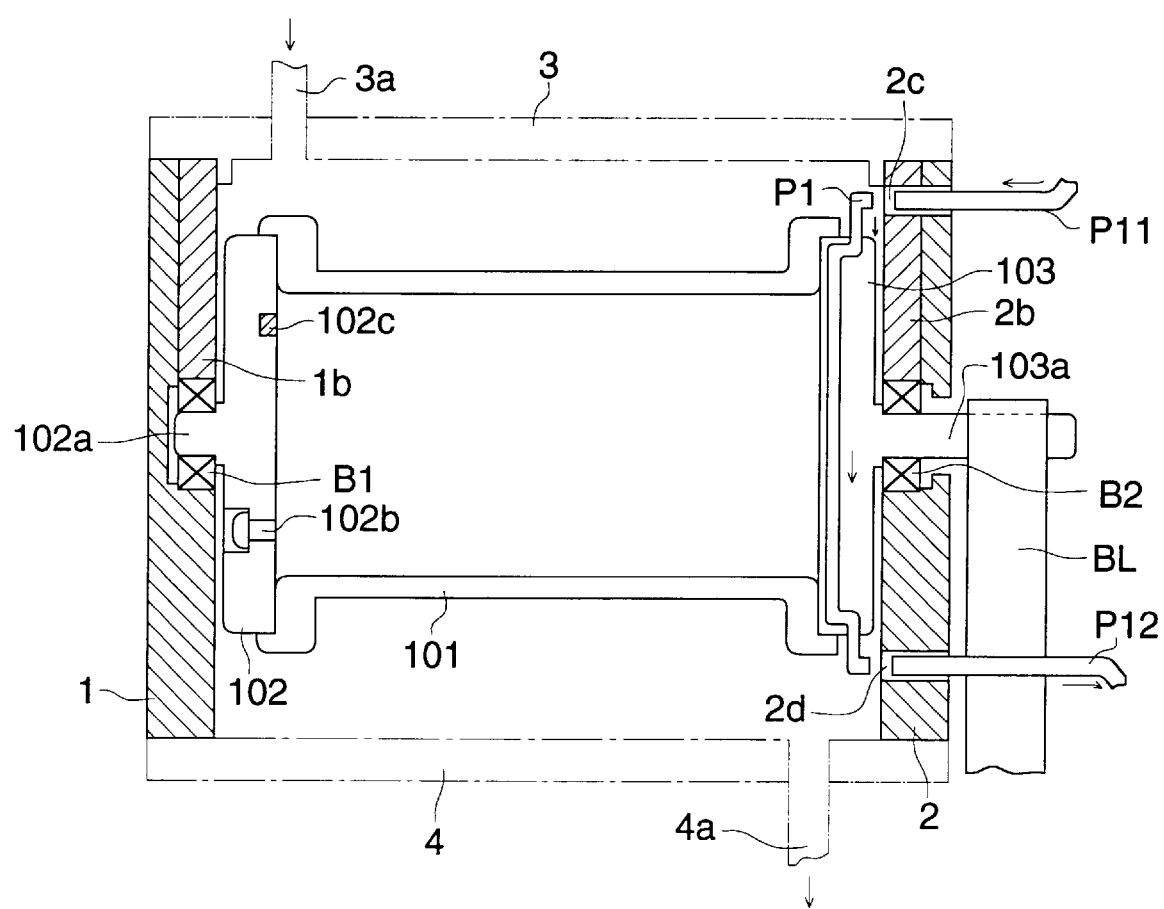
FIG. 11 is a cross sectional view showing one example of a manufacturing apparatus.
Figure 12:
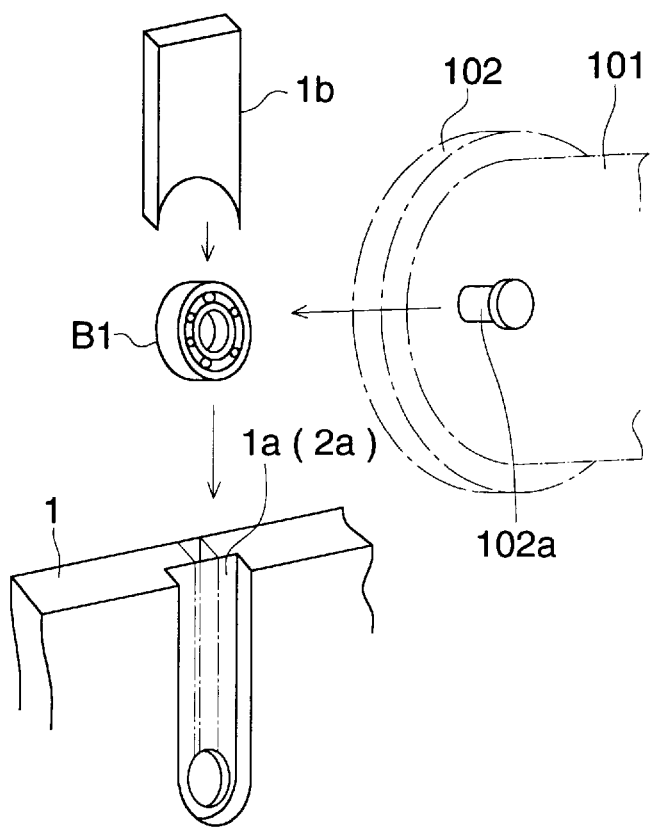
FIG. 12 is a drawing showing mounting of a die to a steam chamber.
Figure 13:
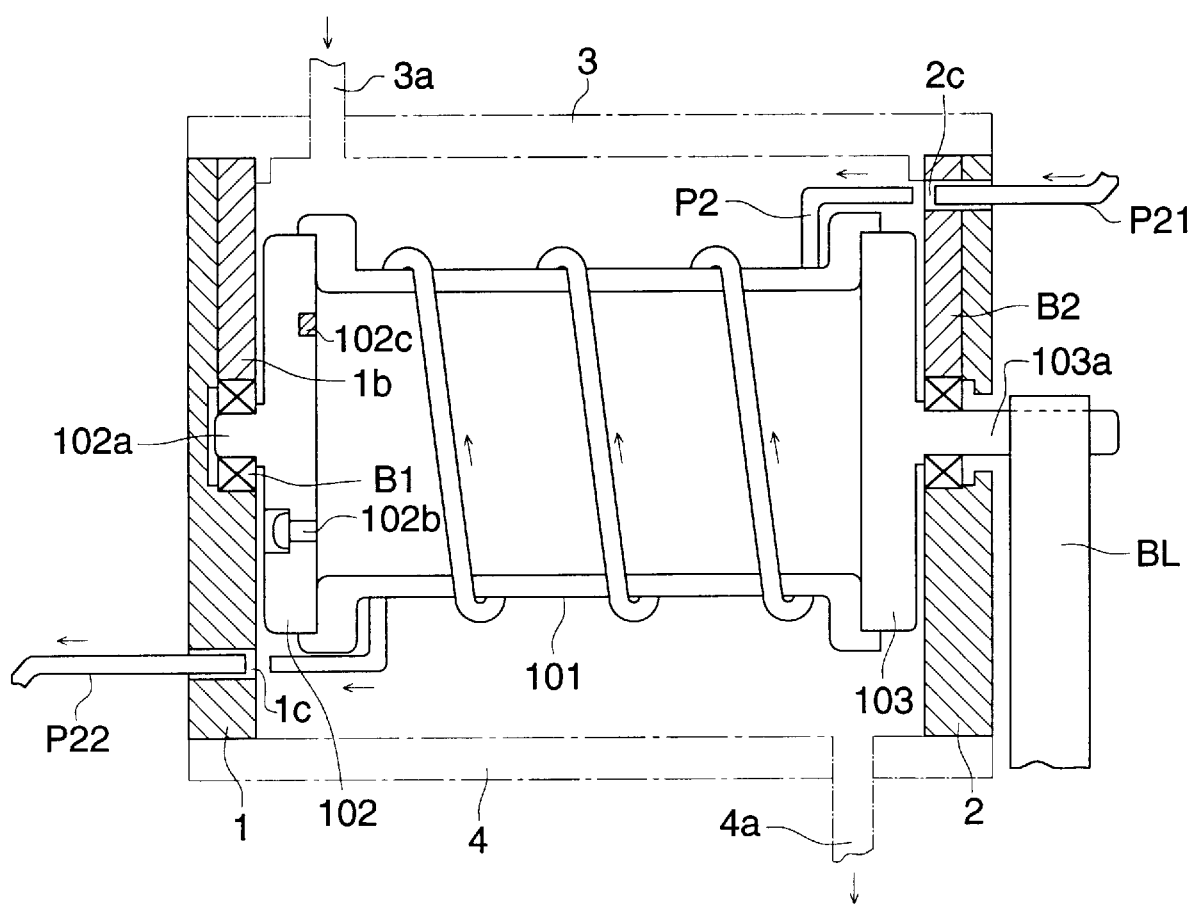
FIG. 13 is a drawing showing another example of chilling the die.

Referring to FIGS. 3, and 11 to 13, a production method for a cylindrical substrate for use in an image forming apparatus will be explained as follows. FIG. 3 is a view showing processes of a production method for a cylindrical substrate of the electrostatic image forming body. FIG. 11 is a sectional view showing another example of the production apparatus, while FIG. 12 is a view showing mounting of a die onto a steam chamber, and FIG. 13 is a view showing another example of cooling the die.

In the production apparatus shown in FIG. 11, numeral 101 is a cylindrical die, the inner surface of which is ground and formed into an excellent and highly accurate cylindrical surface. Numeral 102 is a left cover, while 103 is a right cover, and the cylindrical die 101 is interposed between covers 102 and 103 from the left and right sides respectively, wherein when the die 101 is interposed, liquid loaded inside the die 101 does not leak out. Numeral 102b is an injection port from which polymerizable liquid material is injected. Numeral 102c is a thermometer used to measure the temperature inside the die 101.

A steam chamber is composed of a left side plate 1, a right side plate 2, an upper plate 3 and a lower plate 4. Steam used to heat the die 101 is fed through air inhaling port 3a provided on the upper plate 3 to the inside of the steam chamber, and then is exhausted from an air exhaling port 4a provided on the lower plate 4.

Both bearings B1 and B2 are fitted onto shafts 102a and 103a respectively provided on the left cover 102 and the right cover 103 which interpose the die 101, and then the bearings B1 and B2 fitted with the left and right covers 102 and 103 are inserted into guiding grooves 1a and 2a (not shown) respectively. After left and right stoppers 1b and 2b are fitted respectively, the upper plate 3 of the steam chamber is mounted. The stoppers 1b and 2b are pressed down by the upper plate 3, and then the die 101 is loaded inside the steam chamber. A cooling pipe P1 for cooling is provided through the inside of the right cover 103.

In the apparatus, the steam chamber is adjusted so that the rotary axis of the die 101 is set in a horizontal direction. After injecting polymerizable liquid material, shaft 103a of the right cover 103 is rotated by the driving force of a driving belt BL stretched on the shaft 103a. The left and right shafts 102a and 103a of the die 101 integrated with the right cover 103, are pivotally supported by the bearings B1 and B2, and the die 101 is rotated at high speed.

After the molding is completed, the die 101 is removed from the steam chamber, and the cylindrical substrate is taken out by moving either the left cover 102 or the right cover 103.

In production processes shown in FIG. 3, initially polymerizable liquid material, for example, methyl methacrylane monomer is synthesized, to which a catalyst is added in order to speed up the process to monomerize, while the viscosity is adjusted 10 cp to 400 cp, and then is injected into the cylindrical die 101.

If the viscosity is less than 10 cp, it takes too long to harden and productivity is severely lowered, because during the injection process to the die 101, the liquid material will dribble or the degree of polymerization of the liquid is too low. On the contrary, if the viscosity is more than 400 cp, the deviation of injection amount is caused or air bubbles can not be exhausted, since the viscosity is too high.

It is necessary for the cylindrical die 101 that the inner diameter (i.e., corresponding to the outer diameter of the substrate) is 20 mm to 200 mm, the length is 200 mm to 2000 mm.

When the inner diameter is less than 20 mm, it is difficult to carry out a separation between the cylindrical substrate and the die 101, and when the inner diameter is more than 200 mm, the roundness of the cylindrical substrate is specifically deteriorated since the deformation during the separation caused by the large difference of the coefficient of thermal expansion between the die 101 and the cylindrical substrate. Further, if the length is less than 2000 mm, the size required for normal image formation is insufficient, and if the length is more than 2000 mm, the deformation along the length of the cylindrical substrate, is not uniform, specifically resulting in deterioration of the straightness, even if a cooling method at the time of the separation from the die 101, which will be discussed later, is adopted.

The polymerizable liquid material is rotated together with the die, and uniform polymerization progresses under proper heating. After the polymerization is completed, annealing is further conducted at a temperature under that proper heating in order to remove the all strain within the cylindrical substrate. After annealing for a predetermined period of time, both ends of a cooling pipe P1 provided on the right cover 103 of the die 101 are made to coincide with mating incoming flow pipe P11 and outgoing flow pipe P12 fitted in holes 2c and 2d respectively, enabling cooling water to flow, while the die 101 is stopped. While the die is stopped, both the incoming flow pipe P11 and the outgoing flow pipe P12 are automatically fitted to the cooling pipe P1, the cooling water flows inside the cooling pipe P1 and thereby cools the cylindrical substrate located on the inner surface of the die 101.

In this way, cooling by the cooling water is carried out from one end of the die 101, namely from the right cover 2 equipped with the cooling pipe P1 toward left end in this embodiment, the separation on the outer circumferential surface of the cylindrical substrate is gradually carried out from right end toward the left end, any internal stress during the separation is uniformly applied from the right end toward the left end, so that the cylindrical substrate is cooled and separated while maintaining uniform surface flatness and a highly accurate roundness without generating surface unevenness or crease due to internal stress or strain.

After the cylindrical substrate is separated, the heating by means of the steam is stopped, the newly formed cylindrical substrate is removed from the die, is cut, and then is buffed in a finishing process. If necessary, further annealing is carried out, and finally the cylindrical substrate for the image forming apparatus is complete. After a coating of OPC (organic photosensitive layer) is applied to the newly completed cylindrical substrate, a photoreceptor drum as an electrostatic image forming body, which will be discussed later, is formed. The heating process during drying, after OPC coating, may be replaced with an annealing process after the buffing.

As indicated in FIG. 13, the cylindrical substrate located on the inner circumferential surface of the die 101 may also be cooled by the following steps. Initially, the cooling pipe P2 is spirally wound around and in contact with the outer circumferential surface of the die 101. Then, the cooling pipe P2 is mated to incoming flow pipe P21 and outgoing flow pipe P22 fitted respectively in the hole 2c of the right side plate 2 and the hole c of the left side plate 1 of the steam chamber, and then the die 101 is stopped. The incoming flow pipe P21 and the outgoing flow pipe P22 may be automatically mated onto the cooling pipe P2 while the die is stopped, and then cooling water is fed through the cooling pipe P2.

In this case, cooling by means of the cooling water is carried out from one end of the die 101, namely from the right end toward left end in FIG. 13, and the separation of the outer circumferential surface of the cylindrical substrate is gradually carried out from right end toward the left end, any internal stress during the separation is uniformly applied from the right end toward the left end, and the outer circumferential surface of the cylindrical substrate is separated while maintaining a uniform surface flatness and a highly accurate roundness without generating surface unevenness or creases due to inner stress or strain.

According to the method of the present invention based on the above description, the cylindrical substrate having excellent dimensional accuracy, the roundness and the straightness, uniform surface flatness, both cylindricity and roundness of 10 $\mu$m to 50 $\mu$m can be achieved. As indicated by the dotted line in FIG. 3, the cylindrical substrate can be produced at higher accuracy by further cylindrical substrate processing by using a lathe, if necessary, further by applying a cutting process to the outer circumferential surface, and by a buffing process after the cutting. The annealing is again carried out, and the cylindrical substrate for the image forming apparatus is completed. The OPC (organic photosensitive layer) is coated onto the completed cylindrical substrate, and finally the photoreceptor drum is formed as an electrostatic image forming body for the image forming apparatus which will be discussed later. Annealing after the turning process may be used in place of the heating for drying, after the OPC coating.

An OPC solution optionally containing a functional monomer or a cross-linking agent, is coated on the cylindrical substrate and heated to obtain a hardened, heat-resistant and solvent resistant layer so that the deterioration of dimensional accuracy due to the influence of the solvent or heat during the OPC coating process or drying process can be minimized.

The cylindrical substrate thus obtained by these production processes has no internal strain, a hardness equivalent to aluminum, a light transitivity of not less than 90%, and impact-resistance property of approximately 15 times that of glass.

Further, in order to reduce fatigue and deterioration during repeated use or to enhance durability, a proper amount of a dependency reducing agent against environment such as an antioxidant, an ultraviolet ray absorbing agent, an electron acceptability substance, a surface refining agent, or a plasticizer, which are well known in the art, may be added to any photosensitive layer of the photoreceptor drum, as necessary.

In order to enhance durability, a nonsensitive layer such as a protective layer, other than the photosensitive layer may be provided, as necessary.

It is possible to achieve more preferable physical properties of the cylindrical substrate for use in an electrostatic image forming body by mixing a cross-linking agent, an electric conductivity providing agent, or a coloring agent with the polymerizable liquid material. For example, it is possible to enhance heat-resistance, resistance to solvents and strength, by adding the cross-linking agent, to prevent electrostatic soil due to ambient dust and to replace electric conductive layer by the electrical conductivity providing agent. These are effective for the electrostatic image forming body to which an outer force or heat is applied during use, or for a substrate onto which a solution is coated.

As will be discussed later, the provision of the electrical conductivity onto the cylindrical substrate according to the present invention may be attained such that electric conductivity processing is carried out to the surface thereof or electric fine conductive particles are added during polymerization. When the substrate is utilized in a conventional electrophotographic type copier or printer, excellent images can be attained, and specifically, images without uneven density or uneven coloring generated due to inadequate dimensional accuracy, can be obtained.

The transparent cylindrical substrate can be obtained by properly selecting raw material as discussed above, specifically by including a methyl methacrylate monomer as a polymerizable liquid material. This is a transparent cylindrical substrate which can be applied to an image forming apparatus, which will subsequently be explained, wherein exposure is conducted from inside an electrostatic image forming body, by which excellent images are obtained. A photoreceptor drum is formed by providing a photosensitive layer on the circumferential surface of the cylindrical substrate. The image forming apparatus in which an internal exposure is carried out on the photoreceptor drum and forming images, has excellent properties by employing the cylindrical substrate according to the present invention.

EXAMPLE 2

1. Formation of a cylindrical substrate

Azobisisobutyronitrile as a catalyst to accelerate the polymerization is added to methyl methacrylate monomer, and the heating processing is conducted at 40° C. for preliminary polymerization, and a sirupy polymerizable liquid material at a viscosity of 100 cp was obtained. Using the apparatus explained in FIG. 13, the polymerizable liquid material was injected into a cylindrical die having 100 mm in inner diameter and 80 cm in length, then the die was rotated while bringing the polymerizable liquid material into close contact with inner wall of the die by means of centrifugal force, and also while heating by means of steam was conducted to the entire die at 100° C. for 8 hours to achieve polymerization. Furthermore, annealing was conducted at that temperature for further 2 hours, and then the die for the cylindrical substrate was cooled at the speed of 10° C./min. from one end thereof by means of cooling whereby separation of temperature, thereby separation of the cylindrical substrate from the die was carried out. After separation was completed, the steam supply was stopped, the die was removed from the steam chamber, and then the cylindrical substrate was removed from the die. Two rolls of cylindrical substrates, each having a 100 mm outer diameter, a 360 mm length, a cylindricity and a roundness of about 20 μm, after the cutting of end portions of the obtained cylindrical substrate, and the buffing thereto were conducted. In addition, if necessary, the cutting processing of the outer circumferential surface can be conducted using a cutting tool, and the cylindrical substrate of the present invention can be obtained.

Employing a coating liquid obtained by mixing a binder and ITO, which were dip coated onto the circumferential surface of the cylindrical substrate, and thereby two rolls of transparent cylindrical substrate were obtained having an electroconductive layer, and a light transmissivity to visible rays or infrared rays of 85%.

2. Coating of OPC

| | |
|---|---|
| Alcohol soluble polyamide CM-8000 (made by Toray Industries Co. Ltd.) | 4 parts by weight |
| Methanol | 80 parts by weight |
| 1-butanol | 20 parts by weight |

Initially, the above composition was mixed and dissolved to obtain a sub-layer coating liquid. The sub-layer coating liquid was dip coated onto the transparent cylindrical substrate of the invention to obtain a sub-layer of 0.5 μm in thick:

| | |
|---|---|
| Y type titanyl phthalocyanine | 4 parts by weight |
| Silicone resin solution KR-5240 (made by Shin-etsu Chemical Co. Ltd.) | 45 parts by weight |
| 2-butanone | 100 parts by weight |

The above composition was mixed and dispersed for 10 minutes to obtain a charge generation layer coating liquid. The coating liquid was dip coated onto the sub-layer coating layer to obtain a charge generation layer having 0.25 μm of thickness.

| | |
|---|---|
| Charge transport material T | 8 parts by weight |
| Bisphenol Z type polycarbonate Z-300 (Mitsubishi Gas Chemical Co., Ltd.) | 12 parts by weight |
| 1,2-dichlorethane | 100 parts by weight |

T-1

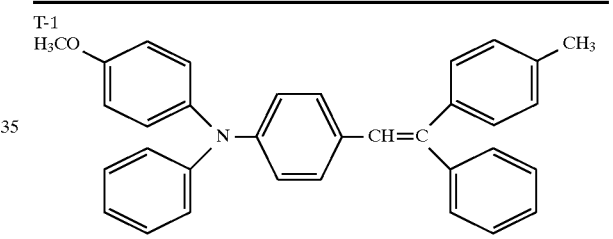

The above composition was mixed and dissolved to obtain the charge transport layer coating liquid. The coating liquid was dip coated onto the charge generation layer, and heated at 90° C. for one hour to form 25 μm of the charge transport layer, thereby the photoreceptor drum according to the Example of the invention was obtained.

3. Image evaluation according to image formation

The photoreceptor drum on which the cylindrical substrate according to the present invention having the photosensitive layers is provided, was mounted onto an inner exposing type electrophotographic image forming apparatus of the structure explained in FIG. 1, and image formation was conducted. As a result, images with sufficient image density and without fog were obtained. Specifically, excellent images in terms of uniformity with no deviation in density or color tone observed in the images, were obtained. No change of uniformity in image quality of these excellent images was been observed after 10,000 continuous prints.

EXAMPLE 3

Using the apparatus explained in FIG. 11, a cylindrical substrate having about 20 μm of cylindricity and roundness was formed using the same production method as that in Example 2. The OPC coating was carried out with the same procedure as that in Example 2, and thereby the photoreceptor drum for use an the electrophotographic image forming apparatus was obtained. When image evaluation based on the image formation using the inner exposing type electrophotographic image forming apparatus of the structure explained in FIG. 1, and similar to Example 2, images with sufficient density and without fog were obtained. Specifically, excellent images in terms of uniformity were obtained in which no deviation in density or color tone of the images was observed. No change in image quality on these excellent images in terms of uniformity was observed after 10,000 continuous prints.

According to the present invention, the separation of the outer circumferential surface of the cylindrical substrate progresses uniformly from one end toward the other end thereof due to cooling of the die, beginning with one end thereof, and thereby the cylindrical substrate in which no surface unevenness due to the internal stress during the separation is generated and the surface of the substrate is smooth and the cylindricity and the roundness are high, can be produced.

According to the present invention, the cylindrical substrate with the high cylindricity and roundness in which deformation during the separation is further prevented, can be produced.

According to the present invention, the cylindrical substrate with the excellent transparency and strength, and specifically on which the surface thereof is smooth, and the cylindricity and the roundness are excellent, can be produced.

According to the present invention, an image forming apparatus in which excellent images without fluctuation of image density or color tone are obtained, can be produced by employing a cylindrical substrate as the electrostatic image forming body wherein there is no surface unevenness of the outer circumferential surface due to internal stress during the separation, and high cylindricity and roundness.

According to the present invention, the image forming apparatus in which excellent images without variation of image density or color tone are obtained, can be produced by employing the cylindrical substrate as the electrostatic image forming body wherein deformation during the separation is negligible, and the cylindricity and the roundness are high.

According to the present invention, the image forming apparatus in which excellent images can be obtained, using the transparent cylindrical substrate wherein the cylindricity and the roundness are high and the transparency is excellent.

Figure 15:
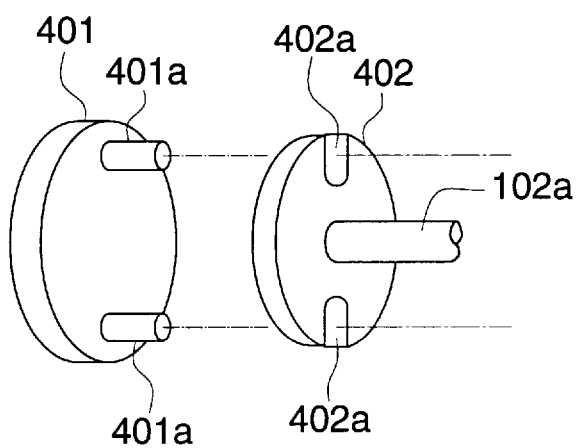
FIG. 15 is a drawing showing one example of a coupling means.
Figure 16:
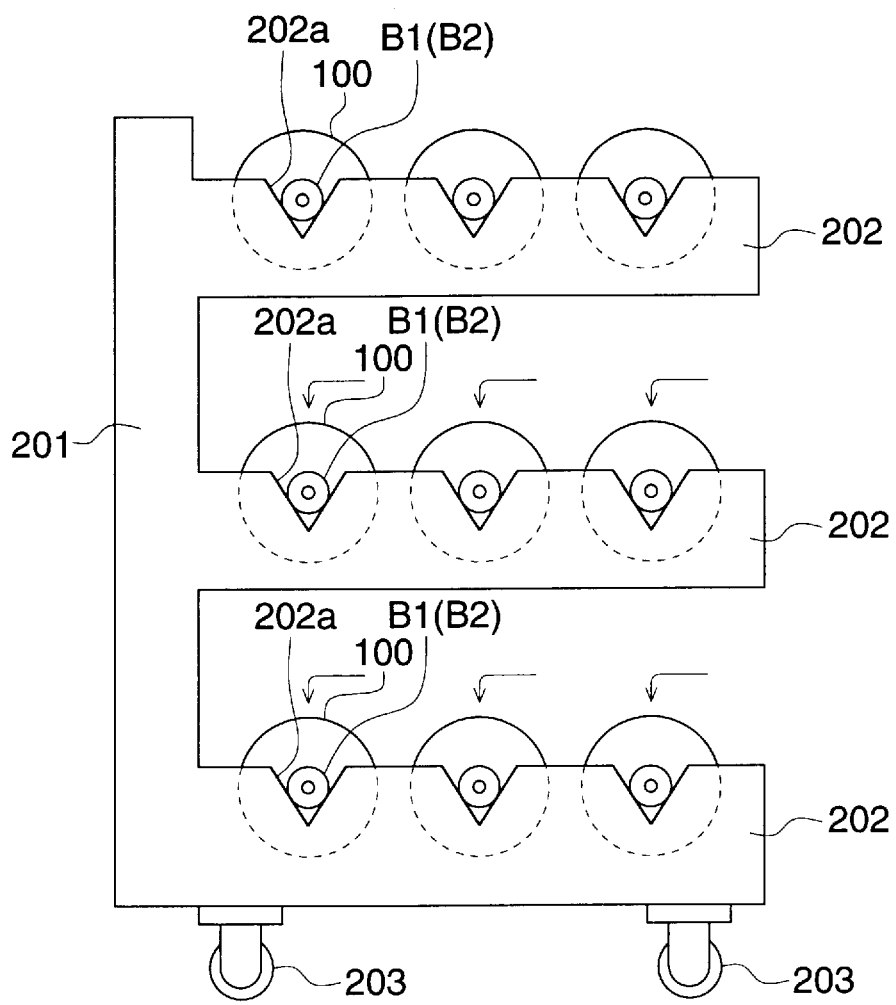
FIG. 16 is a drawing showing a carriage.

A production method of a cylindrical substrate for use in an electrophotographic process in the present invention will be explained while referring to FIGS. 3, and 14 to 18. FIG. 3 is a view showing a production method of a cylindrical substrate used for an electrostatic image forming body, FIG. 14 is a sectional view of an example (Example 4) of a production apparatus, FIG. 15 shows an example of a coupling means, FIG. 16 is a carriage, FIG. 17 shows a view of insertion of the carriage into a steam chamber, and FIG. 18 provides a view of an example of a coupling method of a driving means.

Figure 14:
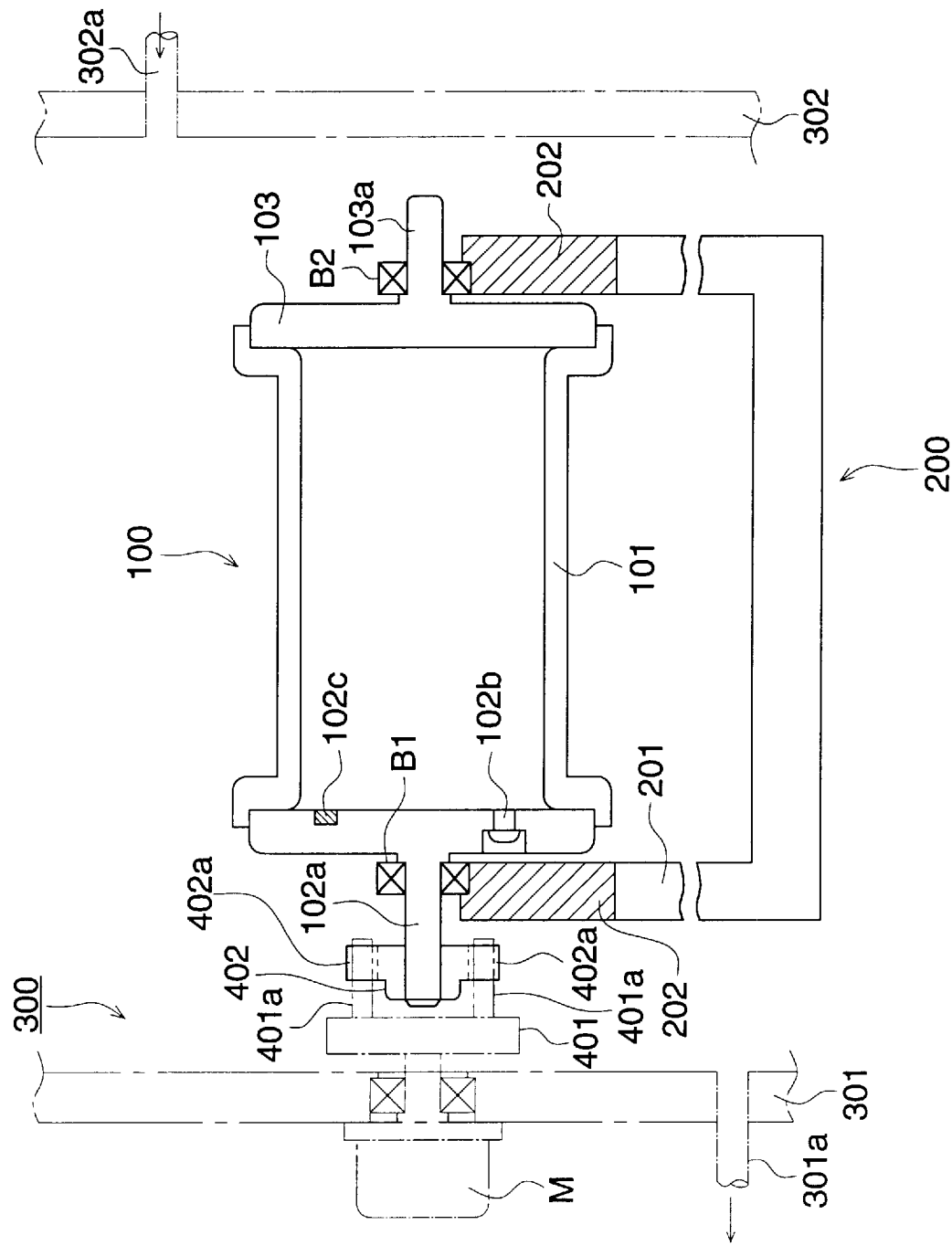
FIG. 14 is a cross sectional view showing one example of the manufacturing apparatus.

In a production apparatus indicated in FIG. 14, numeral 101 is a cylinder, the inner surface of which is ground and forms an excellent and accurate inner surface. Numeral 102 is a left cover, while 103 is a right cover, and the cylinder 101 is interposed between the left and right covers 102 and 103 from left and right ends, which compose die 100, wherein when the die 100 is interposed, a liquid fed inside the die 100 does not leak out. Numeral 102b is an injection port through which a polymerizable liquid material is injected. Numeral 102c is a thermometer to measure temperature inside the die 100.

Bearings B1 and B2 are press fitted to shafts 102a and 103a respectively provided on the covers 102 and 103 interposing the cylinder 101. The die 100 is loaded into carriage 200 in such a manner that the bearings B1 and B2 are fitted into V-shaped grooves 202a of arms 202 provided on both sides of support 201. The dies 100, as shown in FIG. 16, are placed successively on the arms 202 from the rear end toward the front end.

Figure 17:
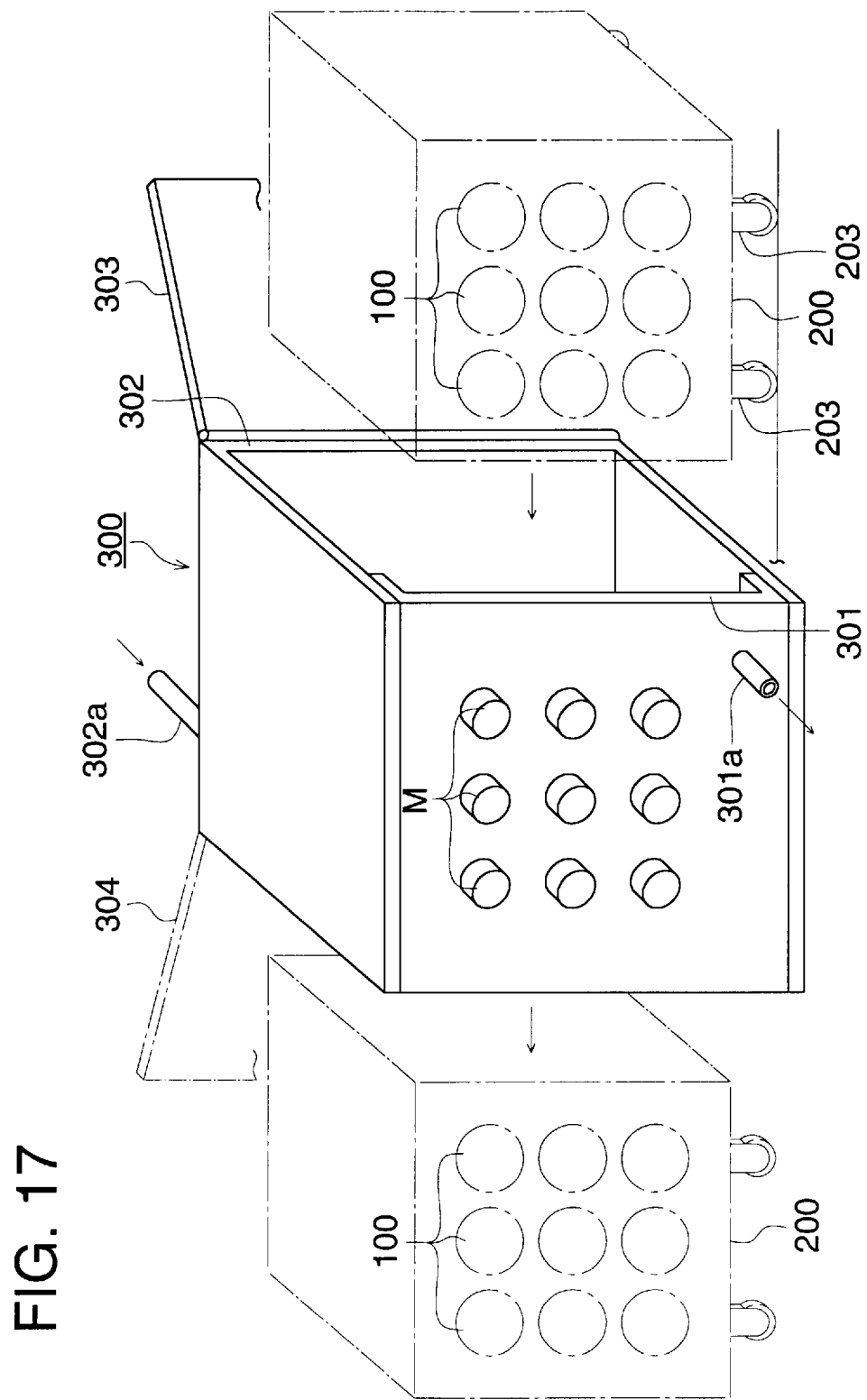
FIG. 17 is a drawing showing insertion of the carriage to the steam chamber.
Figure 18:
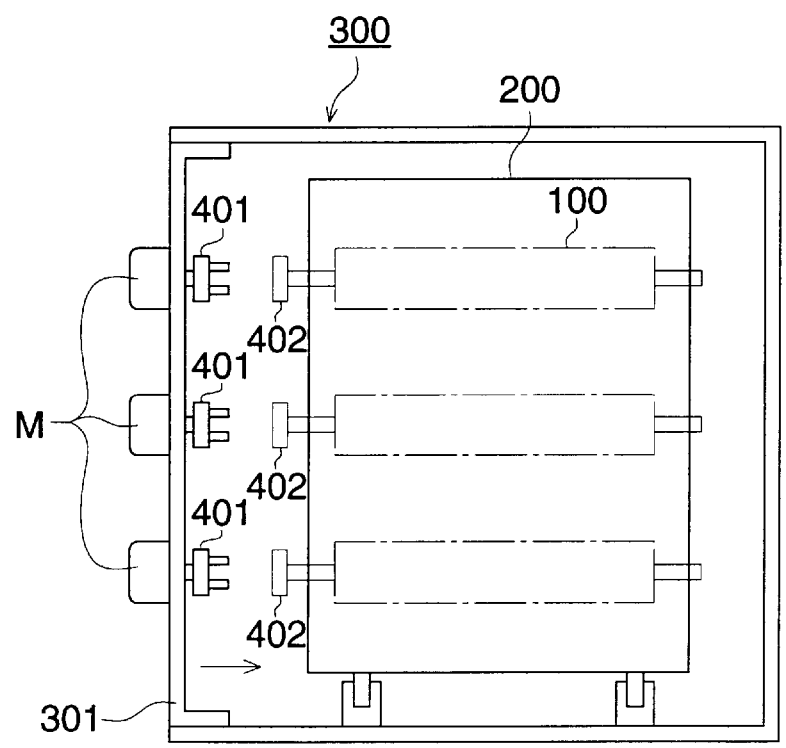
FIG. 18 is a drawing showing one example of connecting a driving means.

As shown in FIG. 17, casters 203 are mounted on the carriage 200. The carriage 200 on which the dies 100 are loaded is conveyed into a steam chamber 300, after a front door 303 is opened.

Plural drive motors M, as a rotary means, are mounted on the outside of a left side plate 301 of the steam chamber 300. The left side plate 301 on which the drive motors M are mounted is moved on rails or guiding grooves not shown toward the carriage 200, as shown by an arrow of FIG. 18, and each of the drive motors M is coupled with each of the shafts 102a of the left cover 102 on the dies 100 by a coupling means constituting a coupling member 401 and a receiving member 402. As indicated in FIG. 15, each of the drive motors M is coupled with each of the shafts 102a by coupling two pins 401a on the coupling member 401 with two coupling notches 402a on the receiving member 402.

Each of the drive motors M, rotates each of the dies 100 at a high speed on the bearings B1 and B2 held in the V-shaped grooves 202a provided on the arms 202 of the carriage 200.

Steam is fed through an air entry port 302a provided on the right side plate 302 into the steam chamber 300, and the steam is exhausted through an air exhaust port provided on the left side plate 301 after the steam heats the dies 100 and molding operation is completed.

After the cylindrical substrate is molded, cool air is fed from the air entry port 302a into the inside the steam chamber 300, and the cool air is exhausted through the air exhaust port 301a, provided on the left side plate 301, after the dies 100 are cooled.

The carriage 200 is conveyed from the steam chamber 300 after a rear door 304 of the steam chamber 300 is opened. Each of the dies 100 is removed, when either the left or right covers 102, 103 are moved, and then the cylindrical substrate is removed from the dies. Subsequently, the carriage 200 on which plural dies 100 are mounted and into each of which nonmolded polymerizable liquid material was injected, is conveyed into the steam chamber 300, and molding is then carried out.

Uniform polymerization is accelerated by rotating each of the dies 100 by means of individual drive motor M, and by proper heating of each of the dies 100. After polymerization is completed, annealing is carried out at the same temperature after completion of polymerization in order to reduce the likelihood of the deformation of the entire cylindrical substrate. After annealing for a predetermined period of time is carried out, cooled air is fed through the entry port 302a into the steam chamber 300, thereby cooling the dies 100, after which the air is exhausted from the exhaust port 301a provided on the left side plate 301, which cools the cylindrical substrate.

In the centrifugal polymerizing method cited above, it is preferable to use and mold polymerizable liquid material under condition that the inner diameter of the die 100 is 50 to 200 mm and the thickness of raw material of the cylindrical substrate, after molding, is 1 to 5 mm.

It is preferable for the cylindrical substrate, molded in the die 100, for use in an electrophotographic image forming apparatus, which will be discussed later, to have an outer diameter of 50 to 210 mm. If the inner diameter is less than 50 mm, plural image exposing means, to be disposed inside the electrostatic image forming body on which the cylindrical substrate is mounted, can not be inserted, or plural developing means or plural charging means, to be provided on a periphery of the electrostatic image forming body, can not be disposed. On the contrary, if the inner diameter of the substrate exceeds 210 mm, the cylindrical substrate may be deformed by the pressing force of the plural developing means or a cleaning device.

In addition, if the thickness of the substrate is less than 1 mm, the strength as the substrate for electrophotography is insufficient, resulting in the tendency of for deformation or breakage, and in fluctuation of the thickness due to uneven polymerization. In contrast, if the thickness exceeds 5 mm, it becomes difficult to form a uniform raw pipe for a cylindrical substrate. It is required for the roundness of the cylindrical substrate to be not more than 100 $\mu$m, taking into account the focal depth for a life size image formation element, which will be discussed later. If the thickness of the cylindrical substrate is relatively large, the fluctuation of the thickness tends to become larger and the roundness exceeds 100 $\mu$m (due to fluctuation of the roundness becomes large), which exceeds value range for the focal depth of a life size image formation element.

Further, in the centrifugal polymerization method, it is preferable to use and mold polymerizable liquid material under conditions such that the outer diameter of the cylindrical substrate molded on the inner surface of the die 100, is 50 to 200 mm and that the liquid viscosity of the polymerizable liquid material is 10 to 300 mpa·s.

It is preferable for the substrate, molded by the die 100, for use in an electrophotographic image forming apparatus which will be discussed later, that the inner diameter of the cylindrical substrate be 50 to 210 mm. If the inner diameter is less than 50 mm, plural image exposing means to be disposed inside an electrostatic image forming body using the cylindrical substrate will not be inserted, or plural developing means or plural charging means to be provided on a periphery of the electrostatic image forming will result in a larger overall apparatus, and can not be arranged. On the contrary, if the inner diameter of the substrate exceeds 210 mm, the cylindrical substrate can be deformed by the pressing force of the plural developing means or a cleaning device toward the substrate.

Further, if the viscosity of the liquid is less than 10 mpa·s, liquid adhered to the upper part of the cylinder of the rotating die 100 will leak out or dribble to the lower part thereof, which causes fluctuation of the thickness of the substrate. On the other hand, if the viscosity of the liquid exceeds 100 mpa·s, the height of the liquid on the inner surface of the die 100 does not change during rotation, causing thickness fluctuation in the polymerized substrate.

In the centrifugal polymerizing method described above, it is preferable to use and mold polymerizable liquid material under such condition that the outer diameter of the cylindrical substrate molded on the inner surface of the die 100 be 50 to 200 mm and the following condition be satisfied, $$g \leq (\phi \times \omega^2)/2 \leq 10\ g$$

wherein $\phi$ represents the outer diameter of the cylindrical substrate, $\omega$ represents the angular velocity of the die 100 at the position of the inner diameter during molding, and g represents the acceleration of gravity.

It is preferable for the substrate, molded by the die 100, for use in an electrophotographic image forming apparatus which will be discussed later, that the outer diameter of the cylindrical substrate be 50 to 210 mm. If the inner diameter is less than 50 mm, plural image exposing means to be disposed inside an electrostatic image forming body using the cylindrical substrate will not be inserted, or plural developing means or plural charging means to be provided on a periphery of the electrostatic image forming will result in a larger overall apparatus, and can not be arranged. On the contrary, if the inner diameter of the substrate exceeds 210 mm, the cylindrical substrate can be deformed by the pressing force of the plural developing means or a cleaning device toward the substrate.

Further, it is necessary for the liquid to be forced onto the interior wall of the rotating die 100 by the centrifugal force. When $r \times \omega^2$ (r represents the radius of the cylindrical substrate and is equal to $\phi/2$) is less than g and the revolution speed is low, the liquid is not forced against the interior wall of the rotating die 100, but instead dribbles or flows. When $r \times \omega^2$ exceeds $10g$ and the revolution speed is too high, even if uneven amounts of the liquid exists, the unevenness can not be restored to uniformity. Further, vibration due to high speed revolution can be generated, which is not likely to attain the uniformity of the liquid polymer.

Based on the above molding conditions, a production method is provided for a substrate for electrophotography wherein the polymerization is carried out so that the cylindrical substrate is uniform in thickness without deformation or internal stress.

The molding may be conducted in a combination of the above three conditions, thereby providing a production method of the substrate for electrophotography wherein the polymerization is carried out such that the cylindrical substrate is uniform in thickness without deformation or internal stress.

Since the drive motor M as a rotation means is provided outside the steam chamber 300, heating of the rotation means for the production die of the cylindrical substrate is prevented, the failure of the drive motor M is reduced, ensuring that constant high speed rotation is always transmitted by the coupling means to the die 100, and thereby a cylindrical substrate of high accuracy is produced through the resin molding. Furthermore, there is provided a production apparatus for the substrate of the electrophotography at a high production rate wherein a large number of cylindrical substrates are molded simultaneously.

Figure 19:
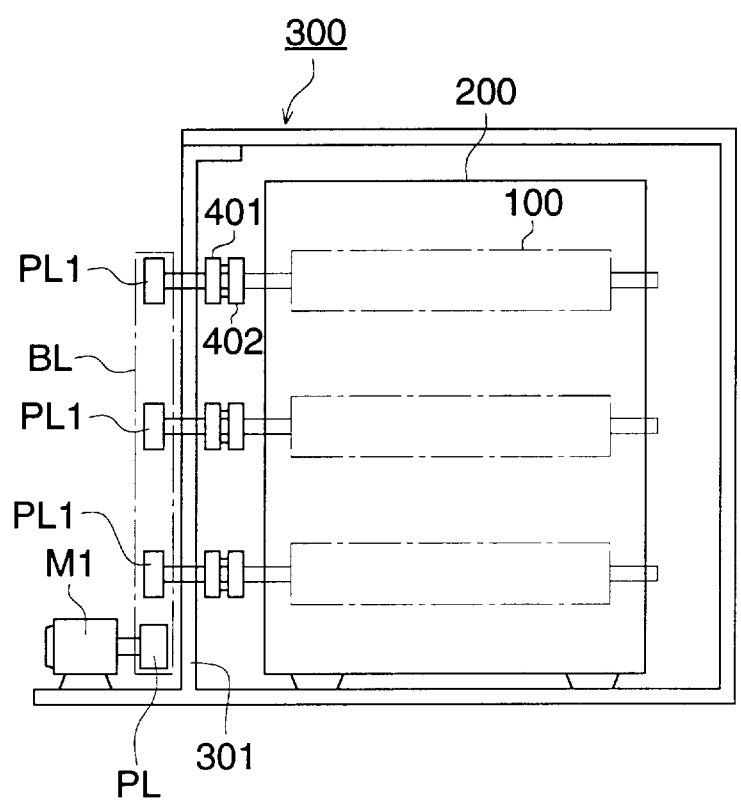
FIG. 19 is a drawing showing another example about how to couple a driving means.

Another example of the coupling method for the drive means is indicated in FIG. 19.

According to FIG. 19, the carriage 200 is fixed inside the steam chamber 300, as similarly explained in FIG. 16, each of the dies 100 in which polymerized liquid material is injected are loaded on the V-shaped grooves 202a of the arm 202 beginning with the rear side of the arm 202. In this case, the dies are loaded on the V-shaped grooves of the arm 202 so that each of the receiving member 402 of the dies 100 is coupled with each of the coupling member 401 provided on the left side plate 301. Similarly as explained in FIG. 15, each of the coupling means is composed of the coupling member 401 and the receiving member 402.

Each of the coupling members 401 is integrated with a pulley PL1 which is rotatably mounted on the left side plate 301. A belt BL is rotated by the drive motor M1 serving as a common rotation means through a parent pulley P1. Each of the pulley PL1 provided outside the steam chamber 300 is rotated by the belt BL, which thereby rotates the dies 100.

The cylindrical substrate for electrophotography can be produced by the centrifugal polymerization method similar to above described method.

Since the drive motor M1 as the common rotation means, the parent pulley PL as the rotation means, the belt BL, and the pulley PL1 are provided outside the steam chamber 300, heating of the rotation means for the production die of the cylindrical substrate is prevented, the failure of the drive motor M is minimal, a constant high speed rotation is always transmitted by the coupling means to the die 100, and thereby a cylindrical resin substrate with high accuracy is produced through molding. Furthermore, there is provided a high productive production apparatus for the electrophotographic substrate wherein a large number of cylindrical substrates are molded simultaneously.

With the present invention, heating of the rotation means for the production die of the cylindrical substrate is prevented, a cylindrical resin substrate of high accuracy is produced through molding, and furthermore a high productive production can be attained.

Further, a production method for an electrophotographic substrate is provided wherein polymerization is carried out such that the cylindrical substrate is uniform in thickness without deformation or internal stress.

What is claimed is:

1. A method of producing a cylindrical photoreceptor for use in an electrophotographic apparatus wherein said photoreceptor is exposed by an exposing device within said photoreceptor, said method comprising
   (a) injecting polymerizable liquid material into a die whose inner surface is cylindrical;
   (b) polymerizing said polymerizable liquid material while rotating said die to form a cylindrical substrate inside said die;
   (c) thereafter removing said substrate from said die;
   (d) coating said substrate with a transparent electroconductive layer; and
   (e) coating said electroconductive layer with an organic photoconductive layer;
   wherein said cylindrical substrate is a light transmitting resin material which transmits light generated by said exposing device; and
   a thickness of the substrate is controlled according to an injecting amount of the polymerizable liquid material.

2. The method of claim 1, wherein the thickness of the substrate is not more than 8 mm.

3. The method of claim 2, wherein the thickness of the substrate not less than 1 mm.

4. The method of claim 3, wherein an outer diameter of the substrate is 50 to 210 mm, a shear modulus of the substrate is $0.12 \times 10^{10}$ N/m$^2$.

5. The method of claim 3, wherein an outer diameter of the substrate is 50 to 210 mm, a Young's modulus of the substrate is $0.30 \times 10^{10}$ N/m$^2$.

6. The method of claim 3, wherein the thickness of the substrate is not more than 5 mm.

7. The method of claim 1, wherein a fluctuation of the thickness of the substrate is not more than 120 $\mu$m.

8. The method of claim 7, wherein a roundness of the substrate is not more than 30 $\mu$m.

9. The method of claim 7, wherein the thickness of the substrate is 1 to 8 mm.

10. The method of claim 7, wherein an outer diameter of the substrate is 50 to 210 mm.

11. The method of claim 1, wherein a coefficient of viscosity of the polymerizable liquid material is 10 to 300 mmPa·s.

12. The method of claim 11, wherein the thickness of the substrate is 1 to 8 mm.

13. The method of claim 11, wherein the thickness of the substrate is 1 to 5 mm.

14. The method of claim 11, wherein an outer diameter of the substrate is 50 to 210 mm.

15. The method of claim 1, wherein the rotation of the die is conducted so that the following conditions are satisfied, $$g \leq (\phi \times \omega^2)/2 \leq 10\ g$$

where $\phi$ represents an outer diameter of the substrate, $\omega$ represents a angular velocity of the rotation at a position of an inner diameter of the substrate, and g represents an acceleration of gravity.

16. The method of claim 15, wherein the thickness of the substrate is 1 to 8 mm.

17. The method of claim 15, wherein the thickness of the substrate is 1 to 5 mm.

18. The method of claim 15, wherein an outer diameter of the substrate is 50 to 210 mm.

19. The method of claim 1 further comprising cooling the die from one end toward the other end after said polymerizing.

20. The method of claim 19, wherein an inner diameter of the die is 20 to 200 mm.

21. The method of claim 19, wherein a length of the die is 200 to 2000 mm.

22. The method of claim 19, wherein the polymerizable liquid material includes methacrylate.

* * * * *